(12) United States Patent
Waggoner et al.

(10) Patent No.: US 11,850,775 B2
(45) Date of Patent: Dec. 26, 2023

(54) MULTILAYER MICROCELLULAR COMPOSTABLE BIOPLASTICS AND THEIR METHOD OF MANUFACTURE

(71) Applicant: Corumat, Inc., Mercer Island, WA (US)

(72) Inventors: Michael Waggoner, Mercer Island, WA (US); Gregory J. Tudryn, Chino, CA (US); Zack Kondo, Alameda, CA (US)

(73) Assignee: Corumat, Inc., Mercer Island, WA (US)

( * ) Notice: Subject to any disclaimer, the term of this patent is extended or adjusted under 35 U.S.C. 154(b) by 80 days.

(21) Appl. No.: 17/480,674

(22) Filed: Sep. 21, 2021

(65) Prior Publication Data

US 2022/0111570 A1 Apr. 14, 2022

Related U.S. Application Data

(63) Continuation of application No. PCT/US2020/025413, filed on Mar. 27, 2020.
(Continued)

(51) Int. Cl.
*B32B 7/022* (2019.01)
*B29C 44/34* (2006.01)
(Continued)

(52) U.S. Cl.
CPC ............ *B29C 44/348* (2013.01); *B29C 44/24* (2013.01); *B29C 44/3415* (2013.01);
(Continued)

(58) Field of Classification Search
CPC ................................ B29C 44/348; B32B 5/20
See application file for complete search history.

(56) References Cited

U.S. PATENT DOCUMENTS

| | | | |
|---|---|---|---|
| 3,389,199 | A | 6/1968 | Bushnell, Jr. et al. |
| 3,651,183 | A | 3/1972 | Hosoda et al. |

(Continued)

FOREIGN PATENT DOCUMENTS

| | | |
|---|---|---|
| EP | 3 010 700 A2 | 4/2016 |
| EP | 3010700 A2 | 4/2016 |

(Continued)

OTHER PUBLICATIONS

Final Office Action dated Nov. 1, 2016 for U.S. Appl. No. 14/308,959, 13 pages.

(Continued)

*Primary Examiner* — Zachary M Davis
(74) *Attorney, Agent, or Firm* — COOLEY LLP

(57) ABSTRACT

The present invention provides a continuous process for solid-state expansion of a biopolymer, e.g., polylactic acid, which can be used to manufacture reduced-density thermoplastic materials with improved physical and thermal properties. By incorporating multiple stages of heating into the process as a means to regulate heat flux, unprecedented control of microstructure and crystallinity can be achieved. Thermoplastic sheets with the distinct cellular characteristics imparted by the process disclosed herein were found to be thicker and stronger than materials prepared by conventional processes. Thermoforming sheets with such characteristics enabled the production of light-weight, thermally-stable, compostable products that resist warping, and are thus suitable for a range of industrial applications.

44 Claims, 15 Drawing Sheets

Related U.S. Application Data

(60) Provisional application No. 62/925,095, filed on Oct. 23, 2019, provisional application No. 62/824,964, filed on Mar. 27, 2019.

(51) Int. Cl.

| | |
|---|---|
| *B29C 44/24* | (2006.01) |
| *B32B 5/20* | (2006.01) |
| *B32B 27/36* | (2006.01) |
| *C08J 5/18* | (2006.01) |
| *C08J 9/12* | (2006.01) |
| *B29K 67/00* | (2006.01) |
| *B29K 105/04* | (2006.01) |
| *B29K 105/16* | (2006.01) |

(52) U.S. Cl.
CPC .......... *B29C 44/3453* (2013.01); *B32B 5/20* (2013.01); *B32B 7/022* (2019.01); *B32B 27/36* (2013.01); *C08J 5/18* (2013.01); *C08J 9/122* (2013.01); *B29K 2067/046* (2013.01); *B29K 2105/041* (2013.01); *B29K 2105/16* (2013.01); *B32B 2307/54* (2013.01); *B32B 2307/542* (2013.01); *B32B 2307/546* (2013.01); *B32B 2307/718* (2013.01); *B32B 2307/72* (2013.01); *B32B 2307/732* (2013.01); *B32B 2439/70* (2013.01); *C08J 2203/06* (2013.01); *C08J 2367/04* (2013.01)

(56) References Cited

U.S. PATENT DOCUMENTS

| | | | |
|---|---|---|---|
| 3,883,625 | A | 5/1975 | Thomas et al. |
| 4,455,272 | A | 6/1984 | Schubert et al. |
| 5,444,113 | A | 8/1995 | Sinclair et al. |
| 5,723,510 | A | 3/1998 | Nadella et al. |
| 5,866,053 | A | 2/1999 | Park et al. |
| 6,232,354 | B1 | 5/2001 | Tan |
| 7,501,175 | B2 | 3/2009 | Branch et al. |
| 7,670,545 | B2 | 3/2010 | Bopp et al. |
| 8,080,194 | B2 | 12/2011 | Nadella et al. |
| 8,377,548 | B2 | 2/2013 | Nadella et al. |
| 8,858,849 | B2 | 10/2014 | Nadella et al. |
| 8,877,331 | B2 | 11/2014 | Nadella et al. |
| 8,926,876 | B2 | 1/2015 | Kumar et al. |
| 9,770,854 | B2 | 9/2017 | Branch |
| 10,322,561 | B2 | 6/2019 | Waggoner |
| 10,513,590 | B2 | 12/2019 | Waggoner |
| 10,800,136 | B2 | 10/2020 | Waggoner |
| 11,661,491 | B2 | 5/2023 | Waggoner |
| 2005/0058824 | A1* | 3/2005 | Fujimoto ............... C08J 9/122 428/314.4 |
| 2006/0091576 | A1 | 5/2006 | Takase et al. |
| 2007/0148384 | A1 | 6/2007 | Bowden et al. |
| 2007/0179253 | A1 | 8/2007 | Matsuoka et al. |
| 2009/0026198 | A1 | 1/2009 | Ichikawa et al. |
| 2009/0104420 | A1 | 4/2009 | Nadella et al. |
| 2009/0309250 | A1 | 12/2009 | Nadella et al. |
| 2010/0029793 | A1 | 2/2010 | Witt et al. |
| 2010/0052201 | A1 | 3/2010 | Nadella |
| 2010/0062235 | A1* | 3/2010 | Nadella ............... B32B 27/308 428/213 |
| 2010/0086758 | A1 | 4/2010 | Takase et al. |
| 2010/0136338 | A1 | 6/2010 | Hiarai et al. |
| 2010/0297416 | A1 | 11/2010 | Kumar et al. |
| 2011/0003133 | A1 | 1/2011 | Kumar et al. |
| 2012/0225961 | A1* | 9/2012 | Van Horn ............... C08J 9/127 521/97 |
| 2013/0292305 | A1 | 11/2013 | Shelby et al. |
| 2013/0303643 | A1 | 11/2013 | Nadella et al. |
| 2013/0303645 | A1 | 11/2013 | Dix et al. |
| 2016/0045879 | A1 | 2/2016 | Kumar et al. |
| 2020/0023609 | A1 | 1/2020 | Waggoner |
| 2020/0325299 | A1 | 10/2020 | Waggoner |
| 2021/0237395 | A1 | 8/2021 | Waggoner |
| 2022/0073956 | A1 | 3/2022 | Waggoner et al. |

FOREIGN PATENT DOCUMENTS

| | | |
|---|---|---|
| JP | H10-235668 A | 9/1998 |
| JP | 2004308077 A | 11/2004 |
| JP | 2006-044726 A | 2/2006 |
| WO | WO-0107166 A1 | 2/2001 |
| WO | WO-2008089358 A2 | 7/2008 |
| WO | WO 2014/205180 A2 | 12/2014 |
| WO | WO-2014205180 A2 | 12/2014 |
| WO | WO-2020198506 A1 | 10/2020 |
| WO | WO-2020198656 A2 | 10/2020 |

OTHER PUBLICATIONS

Final Office Action dated Feb. 20, 2018 for U.S. Appl. No. 14/308,959, 15 pages.
Non-Final Office Action dated Feb. 16, 2016 for U.S. Appl. No. 14/308,959, 6 pages.
Non-Final Office Action dated Jun. 1, 2017 for U.S. Appl. No. 14/308,959, 14 pages.
Non-Final Office Action dated Oct. 18, 2018 for U.S. Appl. No. 14/308,959, 17 pages.
Non-Final Office Action dated Apr. 25, 2019 for U.S. Appl. No. 14/308,959, 18 pages.
Non-Final Office Action dated Aug. 7, 2018 for U.S. Appl. No. 14/930,592, 20 pages.
Third Party Submission Under 37 CFR 1.290 filed Apr. 12, 2018 for U.S. Appl. No. 14/930,592, 21 pages.
Non-Final Office Action dated Dec. 26, 2018 for U.S. Appl. No. 14/930,610, 12 pages.
Final Office Action dated Jun. 21, 2019 for U.S. Appl. No. 14/930,610, 18 pages.
Non-Final Office Action dated Dec. 2, 2019 for U.S. Appl. No. 14/930,610, 22 pages.
Non-Final Office Action dated Jan. 13, 2021 for U.S. Appl. No. 16/374,392, 22 pages.
Partial Supplementary European Search Report dated Jan. 25, 2017 for European Application No. 148145667, 8 pages.
Notice of Preliminary Rejection dated Jun. 25, 2020 for Korean Application No. 10-2015-7036342, with English translation, 5 pages.
Second Notice of Preliminary Rejection dated May 10, 2021 for Korean Application No. 10-2015-7036342, with English translation, 13 pages.
Cha, S. W., "A microcellular foaming/forming process performed at ambient temperature and a super-microcellular foaming process," Dissertation, Massachusetts Institute of Technology, Apr. 1994, 164 pages.
Materials Safety Data Sheet for Polylactic Acid; Jul. 7, 2008, 2 pages.
"The Ideal Gas Law" by University of Waterloo; accessed at http://www.science.uwaterloo.ca/~cchieh/cact/c120/idealgas.html via Wayback Machine; 2004, 1 page.
Wang, X. et al., "Development of Crystallization in PLA During Solid-State Foaming Process Using Sub-Critical $CO_2$," Cellular Polymers, vol. 31, No. 1, pp. 1-18 (2012).
Final Office Action, dated Sep. 22, 2022, for U.S. Appl. No. 16/673,368 (17 total pages).
International Preliminary Report on Patentability for Application No. PCT/US2020/025413, dated Oct. 7, 2021, 13 pages.
International Preliminary Report on Patentability for Application No. PCT/US2014/043120, dated Dec. 22, 2015, 7 pages.
International Preliminary Report on Patentability for Application No. PCT/US2020/025011, dated Oct. 7, 2021, 8 Pages.
International Search Report and Written Opinion, dated Feb. 5, 2015, for International Application No. PCT/US2014/043120 (10 total pages).

(56) References Cited

OTHER PUBLICATIONS

International Search Report and Written Opinion, dated Jul. 20, 2020, for International Application No. PCT/US2020/025011 (9 total pages).
International Search Report and Written Opinion, dated Oct. 21, 2020, for International Application No. PCT/US2020/025413 (16 total pages).
NatureWorks, Technology Focus Report: Polylactic Acid Containing Fillers and Fibers, 2007 (Year: 2007).
Non Final Office Action for U.S. Appl. No. 17/018,398 dated Jan. 13, 2023, 11 pages.
Non-Final Office Action for U.S. Appl. No. 16/673,368, dated May 25, 2022, 15 pages.
Pawar, P. A., et al., "Bioderadable Polymers in Food Packaging," American Journal of Engineering Research, e-ISSN: 2320-0847; p. ISSN: 2320-0936, vol. 2, Issue 5, pp. 151-164 (2013).
Restriction Requirement, dated Aug. 31, 2018, for U.S. Appl. No. 14/930,610 (7 total pages).
Restriction Requirement, dated May 22, 2018, for U.S. Appl. No. 14/930,610 (6 total pages).
Restriction Requirement, dated Oct. 28, 2022, for U.S. Appl. No. 17/018,398 (6 total pages).
Restriction Requirement, dated Sep. 24, 2015, for U.S. Appl. No. 14/308,959 (8 total pages).
Restriction Requirement, mailed Nov. 22, 2017, for U.S. Appl. No. 14/930,592 (7 total pages).
Yang, C., et al., "Merits of the Addition of PTFE Micropowder in Supercritical Carbon Dioxide Foaming of Polypropylene: Ultrahigh Cell Density, High Tensile Strength, and Good Sound Insulation," Ind. Eng. Chem. Res. 2018, 57, 1498-1505, DOI: 10.1021/acs.iecr.7b04644.

* cited by examiner

An SEM micrograph of an expanded sheet and its multilayer microstructure

Elongated microcells at the inner region of the sheet

Microcells at the outer region of sheet (near surfaces)

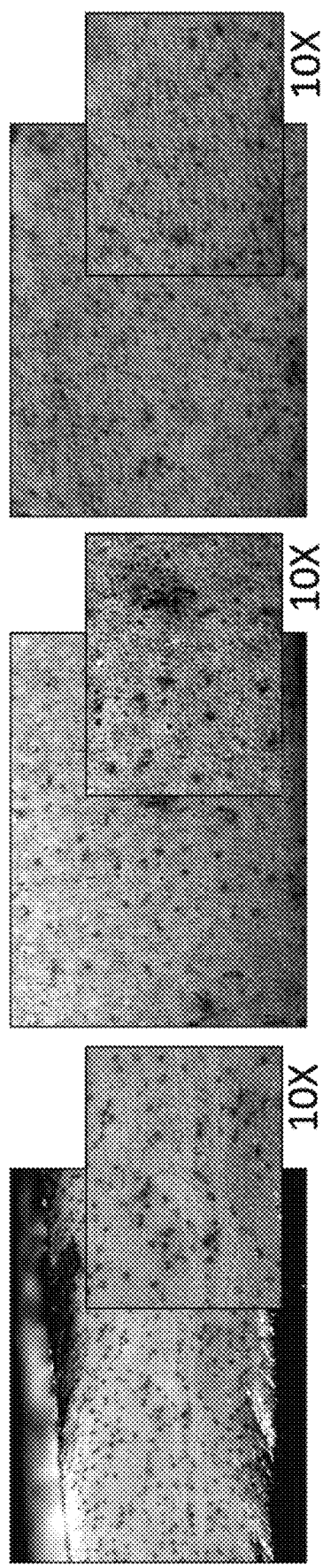

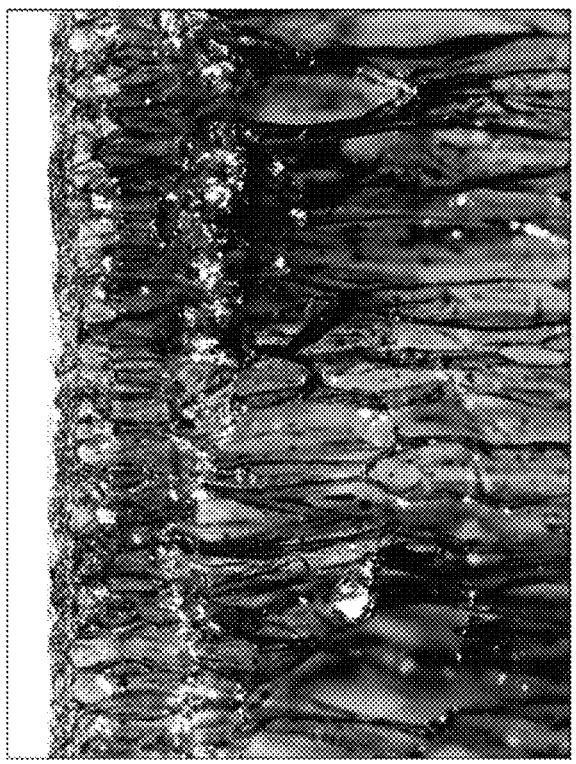
FIG. 11A
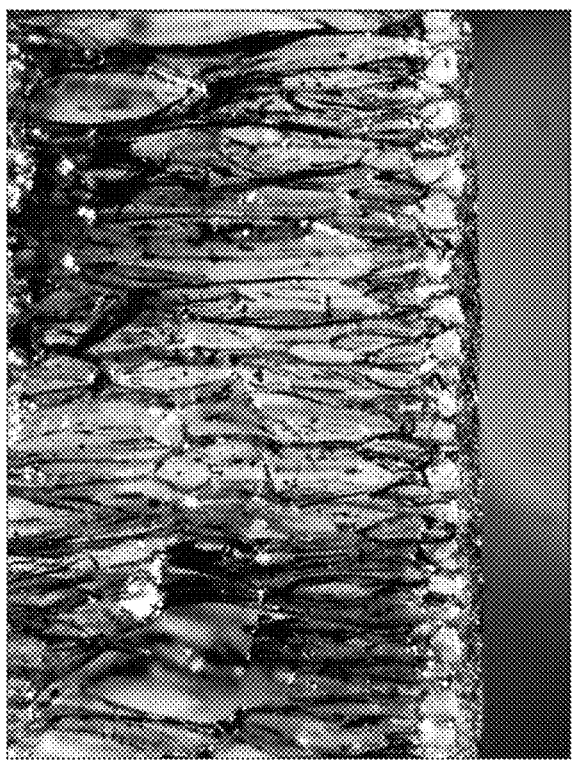
FIG. 11B
FIG. 11C
FIG. 11D
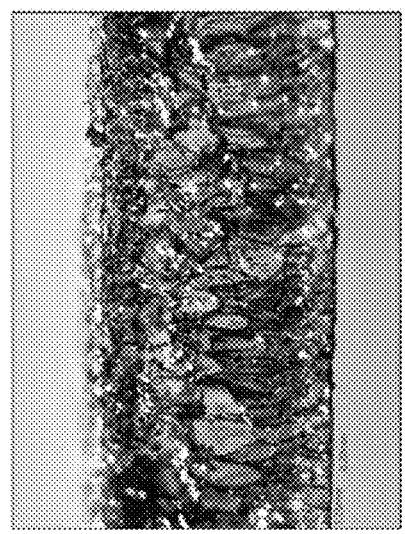
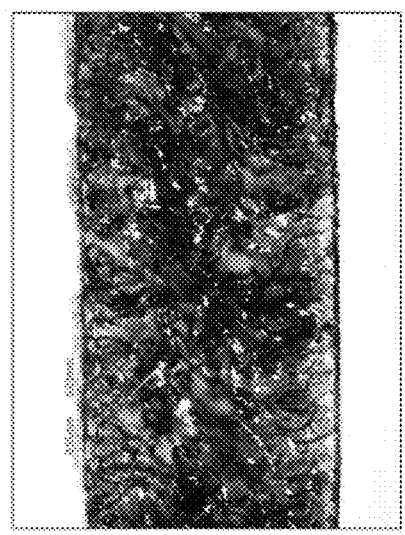
FIG. 11E

MULTILAYER MICROCELLULAR COMPOSTABLE BIOPLASTICS AND THEIR METHOD OF MANUFACTURE

CROSS-REFERENCE TO RELATED APPLICATIONS

This application is a continuation of International Patent Application No. PCT/US2020/025413 filed Mar. 26, 2020 and entitled "Systems and Methods for Recycling of Reduced Density Bioplastics," which claims priority to and the benefit of U.S. Provisional Patent Application Ser. No. 62/824,964 entitled, "Multilayer Microcellular Compostable Bioplastics and Their Method of Manufacture," filed Mar. 27, 2019, and U.S. Provisional Patent Application Ser. No. 62/925,095 entitled, "Multilayer Microcellular Compostable Bioplastics and Their Method of Manufacture," filed Oct. 23, 2019, the disclosures of which are incorporated herein by reference in their entireties.

BACKGROUND

End products from bio-based plastics provide an environmentally friendly alternative to those derived from petroleum. However, they are often costly to manufacture and/or fall short of desired physical performance. Polylactic acid (PLA), for example, has yet to be widely adopted in part due to its low resistance to heat and high cost. Furthermore, PLA is often brittle and solving the problem with commonly used chemical plasticizers can also lead to health issues. Solutions are therefore needed that reduce the cost of biopolymers and improve their performance.

SUMMARY

Embodiments described herein generally relate to expanded thermoplastics, articles of manufacture derived therefrom, and methods of making the same. In some embodiments, a method for continuous solid-state expansion of a thermoplastic is provided, which includes contacting a thermoplastic with a plasticizing gas at a first temperature and a first pressure for a first time period sufficient to provide at least a partially saturated solid thermoplastic impregnated with the plasticizing gas. The impregnated thermoplastic is then optionally cooled at a second temperature and a second pressure for a second time period, the second pressure being lower than the first pressure. The impregnated thermoplastic is then exposed to a third temperature for a third time period no longer than 20 seconds, the third temperature being greater than the second temperature, and within a range that substantially prevents or limits desorption of the plasticizing gas from the thermoplastic. The impregnated thermoplastic is heated to a fourth temperature greater than the third temperature for a fourth time period no longer than 30 seconds to remove no more than a portion of the plasticizing gas from the impregnated thermoplastic and then expanded by heating the impregnated thermoplastic to a fifth temperature, the fifth temperature being greater than the fourth temperature and sufficient to promote rapid desorption of the plasticizing gas, thereby resulting in the formation of a low-density expanded thermoplastic.

In some embodiments, a method for continuous solid-state expansion of a thermoplastic is provided, which includes contacting a thermoplastic with a plasticizing gas at a first temperature and a first pressure for a first time period sufficient to provide at least a partially saturated solid thermoplastic impregnated with the plasticizing gas. The impregnated thermoplastic is then exposed to a second temperature for a second time period, the second temperature within a range that substantially prevents or limits desorption of the plasticizing gas from the thermoplastic. The impregnated thermoplastic is heated to a third temperature greater than the second temperature for a third time period to remove no more than a portion of the plasticizing gas from the impregnated thermoplastic. The impregnated thermoplastic is expanded by heating the impregnated thermoplastic at a fourth temperature, the fourth temperature being greater than the third temperature and sufficient to promote rapid desorption of the plasticizing gas, thereby resulting in the formation of a low-density expanded thermoplastic. In some embodiments, the method can include cooling the impregnated thermoplastic for a cooling time period after the first time period and before the second time period at a cooling temperature and a cooling pressure, the cooling pressure lower than the first pressure. In some embodiments, the cooling temperature can be lower than the first temperature. In some embodiments, the cooling temperature can be lower than the second temperature. In some embodiments, the cooling temperature can be lower than the first temperature and the second temperature. In some embodiments, the cooling temperature can be less than the third temperature (i.e., the temperature at which the impregnated thermoplastic is heated whereby no more than a portion of the plasticizing gas is removed from the impregnated thermoplastic).

Further embodiments provide for an expanded polylactic acid sheet that includes a first outer region, a second outer region, and an inner region disposed between the first outer region and the second outer region. The first outer region and the second outer region have a thickness of about 150 µm to about 200 µm, the first outer region and the second outer region including cells having a dimension of about 75 µm or less. The inner region has a thickness of about 1,000 µm to about 2,000 µm and includes cells having a dimension of at least 50 µm. In some embodiments, the cells in the outer regions and/or the inner regions are closed cells.

The thermoplastics disclosed herein are useful in preparing low-density thermoformed products, comprising a non-laminated polymer sheet including a least 50% by weight of a polylactic acid polymer material. In some embodiments, the non-laminated polymer sheet has a first outer region, a second outer region, and an inner region disposed between the first outer region and the second outer region. The first outer region and the second outer region include cells having a dimension of at about 75 µm or less. The inner region includes cells having a length to width aspect ratio of about 4:1 and the cells have a dimension of at least 50 µm. The low-density thermoformed product undergoes no substantial deformation when tested according to an ASTM D2126 test, and the low-density thermoformed product shows no visible deformation when contacted with water at about 100° C. or less.

BRIEF DESCRIPTION OF THE DRAWINGS

FIGS. 5A-C provide optical microscopy images of surface micropores of thermoformed products prepared according to methods disclosed herein Shallow view, Deep view, and Deep+Heatset view, respectively

FIGS. 11A-E show optical microscope cross-section images, sectioned for in-plane imaging, of an expanded sheet prepared according to the methods described herein from a low-D PLA, and cross section images of a sidewall of sample thermoformed products obtained using the thermoforming or heatsetting methods described herein with views of a top portion, bottom portion, shallow product, deep product, and deep product (Heatset), respectively.

DETAILED DESCRIPTION

Figure 1:
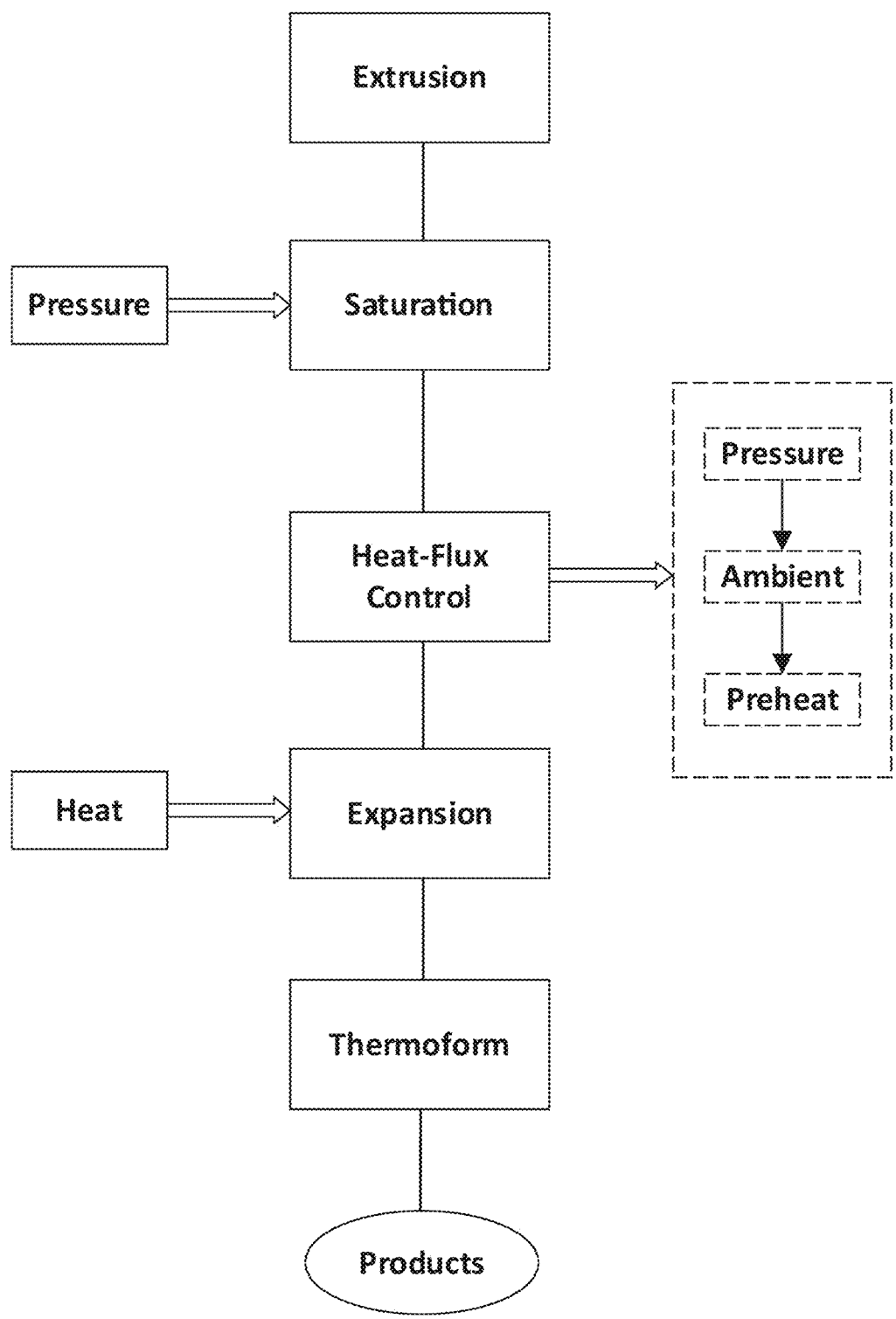
FIG. 1 is a flow diagram providing a general overview of the continuous process for solid-state expansion of thermoplastic materials, according to an embodiment.

Expanded plastic materials derived from petroleum products, such as expanded polystyrene (EPS) foam, have long been used in the food service and packaging industries owing to their cheap cost, light weight, and insulating properties. However, the environmental and health issues associated with these products poses major concerns. For one, petroleum-based products are derived from nonrenewable fossil fuels and synthetic chemicals, thus their industrial manufacturing leads to the production of greenhouse gases and other pollutants. In addition, these products may contain chemical additives such as bisphenol A (BPA), which are potentially harmful to humans.

Waste disposal is also a major problem. As EPS and related materials are non-biodegradable, disposal contributes significantly to landfill waste accumulation. To make matters worse, it is estimated that some 5.3 million to 14 million tons of plastic, or up to 4 percent of the roughly 330 million tons of plastic produced each year, entered the ocean as trash in 2010. While EPS foam can be recycled, the process is expensive and often costlier than manufacturing new foam. These concerns have led some cities to ban the use of EPS foam for single-use food containers and product packaging. Consequently, more environmentally friendly alternatives to these convention plastics are highly desirable.

Over the last several years, bio-based and environmentally friendly alternatives to plastics have emerged, however these products are often costly to manufacture and/or fall short of desired physical performance, which limits their utility in industrial applications. The most recognizable and prominently produced bioplastic, polylactic acid (PLA), is one such example. PLA is a biodegradable, thermoplastic, high modulus polymer that can be obtained from renewable resources, such as corn starch or sugar cane. More recently, PLA is even available in commercial quantities. Yet, despite the environmental advantages, PLA materials have not been widely adopted over two primary issues—low resistance to heat and high cost. PLA is often brittle and solving the problem with plasticizers such as BPA is not a viable option. Solutions are therefore needed that reduce the cost of these biopolymers and improve their performance.

Some aspects of performance can be improved by increasing the crystallinity of the polymer materials during processing. However, while the resulting changes to microstructure and molecular arrangement can increase the service temperature of plastics by providing structures with strong intermolecular forces, high crystallinity tends to reduce flexibility, limiting the ability of the material to stretch in operations such as thermoforming (Ehrenstein, G. W., *Polymeric Materials* 2001, pp. i-xiv).

As noted above, foaming can be a viable method for providing reduced-cost, low-weight expanded polystyrene products with increased flexibility and toughness, but conventional foaming technologies are typically not suitable for bioplastics. Moreover, because of long processing times typically required, using batch-based expansion processes to provide reduced-weight products has been too costly to implement effectively and competitively at scale.

Efforts have been dedicated to foaming (expanding) PLA in a molten form, but it has been difficult to prepare high quality, low-density material by this approach, most likely due to the rheological properties of PLA. Attempts to overcome these issues usually result in processes with a narrow range of workable conditions (e.g., processing times, heat flux, etc.) or in products with only marginally improved properties. Desirable material properties can be related to saturation times and exposure of the PLA to steam or a controlled heat source. Heat flux induced crystallization or crystal nucleation are related to the gas concentration profile in the PLA. Gas-microcell nucleation before placement of the PLA into a bath for expansion can lead to desirable cell size and crystallinity. In some cases, higher quality PLA can be obtained under molten conditions by injecting gas into extruded molten material at high pressure. However, it appears that the process is limited to PLA of a certain composition and molecular weight, and even so, the products obtained from these methods typically only exhibit a moderate weight reduction (~10%)—a feature that substantially limits industrial utility.

Non-expanded PLA may be grouped by some environmental service agencies with non-bioplastics as the standard, non-expanded PLA requires specific composting conditions and facilities to effectively break it down.

Thus, a need remains for novel methods of preparing expanded (foamed) thermoplastic materials (e.g., PLA) in an environmentally friendly and cost-effective manner without compromising the physical properties and performance parameters desirable for a variety of applications.

In some embodiments, the methods disclosed herein address the following problems that limit the utility of previous technologies for solid-state expansion of thermoplastics, including, but not limited to:
  sheet warping or waving during expansion;
  products that are too thin to adequately insulate the exterior surface, which prevents use for hot foodservice;
  products that have poor heat resistance that may make them unsuitable not only for high temperature (e.g., about 100° C.) but also for shipment to the packager because of deformation occurring in transport arising from very high truck trailer interior temperatures (e.g., about 50-70° C.) high atmospheric temperatures (e.g., about 30-45° C.);
  products that are too weak to withstand meat-packaging equipment;
  products that have poor surface quality; and
  the use of thick materials that are difficult to process (e.g., pop or warp during expansion), that are more costly than thinner materials, or require conditions that are economically unfeasible.

To this end, described herein is a continuous expansion process that takes into account the unexpected benefits of controlling heat flux, and provides a window of operating conditions that enables the production of expanded thermoplastic materials with desirable crystallinity, microstructures and physical expansion features for enhanced strength-to-weight and thermal resistance. As a result of these advantageous properties, the expanded thermoplastics prepared according to the disclosed methods can be thermoformed into a variety of industrially useful articles. In some embodiments, the disclosed process utilizing heat flux control can be used to generate stronger, more fracture-resistant and temperature stable food service items (e.g., plates, utensils, trays, clam shell, etc.) compared to standard foams and compostable products from non-expanded PLA.

In addition to enabling advantageous microstructures and desirable crystallinity simultaneously, and enabling products with unexpectedly better performance characteristics (e.g., achieving an advantageous microstructure in combination with desirable crystallinity, and products with a certain thickness to be rigid enough with a light weight, and with a high expansion ratio) by tightly controlling heat flux and/or using tightly controlled multi-stage heat flux as described herein, the inventors also came to the surprising conclusion (based on a myriad of trials) that tightly controlling the heat flux and/or using tightly controlled multi-stage heat flux, as described herein, rather than a single heat flux as described in the prior art, also played a critical role in reducing or removing large amounts of undesirable random process variation, such as in flatness and uniformity, that were otherwise resulting in the expanded material (e.g., waviness, warping, and some defects) without such control. With single heat flux and without precisely controlling heat flux as described herein, the inventors found out that the material did not necessarily expand into shapes that enabled industrially useful products. For instance, products did not necessarily achieve a certain required thickness for sufficient rigidness with single heat flux and heat flux, which is not controlled as described herein. Furthermore, these unexpected benefits of tightly controlling heat flux and/or using tightly controlled multi-stage heat flux, as described herein, were achieved for different grades of PLA.

In some embodiments of the present disclosure, a method for continuous solid-state expansion of a thermoplastic is provided. The method includes contacting a thermoplastic with a plasticizing gas at a first temperature and a first pressure for a first time period sufficient to provide at least a partially saturated solid thermoplastic impregnated with the plasticizing gas. In some embodiments, the method can optionally include cooling the impregnated thermoplastic at a second temperature and a second pressure for a second time period, the second pressure being lower than the first pressure. The method further includes exposing the impregnated thermoplastic to a third temperature for a third time period; the third temperature being greater than the second temperature, and within a range that substantially prevents or limits desorption of the plasticizing gas from the thermoplastic. In some embodiments, the third time period can be no longer than about 10 seconds, no longer than about 15 seconds, no longer than about 20 seconds, no longer than about 25 seconds, or no longer than about 30 seconds, inclusive of all ranges and values therebetween. The method further comprises heating the impregnated thermoplastic to a fourth temperature greater than the third temperature for a fourth time period to remove no more than a portion of the plasticizing gas from the impregnated thermoplastic. In some embodiments, the fourth time period can be no longer than about 10 seconds, no longer than about 15 seconds, no longer than about 20 seconds, no longer than about 25 seconds, no longer than about 30 seconds, no longer than about 35 seconds, no longer than about 40 seconds, or no longer than about 45 seconds, inclusive of all ranges and values therebetween. The method further comprises expanding the impregnated thermoplastic by heating the impregnated thermoplastic at a fifth temperature, the fifth temperature being greater than the fourth temperature and sufficient to promote rapid desorption of the plasticizing gas, thereby resulting in the formation of a low-density expanded thermoplastic.

Figure 2:
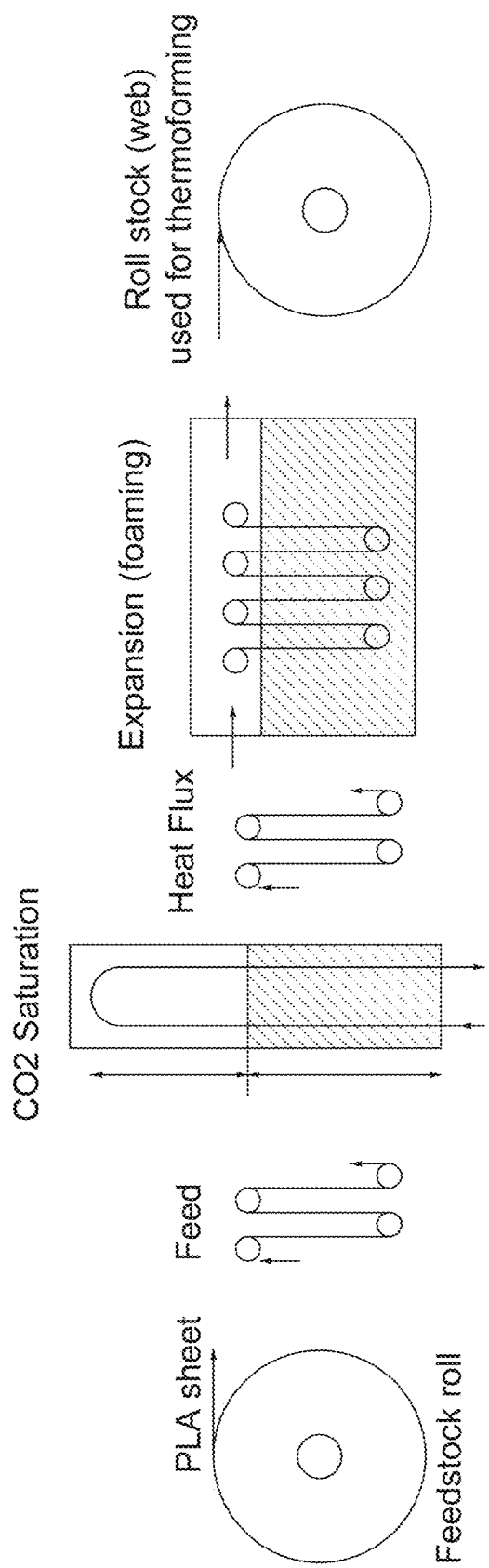
FIG. 2 is a schematic diagram for a representative apparatus used to implement the continuous solid-state expansion process, according to an embodiment.

FIG. 1 provides a flow diagram for the various stages of the continuous process for solid-state expansion of thermoplastic materials according to the methods disclosed herein. The steps of extrusion, saturation, heat flux processing, expansion, and thermoforming are described in more detail below. In non-limiting embodiments, the steps of the disclosed process can be carried out using an apparatus such as the one exemplified in FIG. 2

Extrusion

In some embodiments, the thermoplastic for use in the present methods is in the form of a thermoplastic sheet. Thermoplastic sheets can be prepared by any method known in the art. In some embodiments, the thermoplastic sheet is prepared by extrusion, in some cases by passing pellets through a device suitable for extrusion. Non-limiting examples of suitable extruders include single screw extruder and twin-screw extruders, each of which can range from laboratory scale to production scale. In some embodiments, the pellets are extruded through a flat die onto casting rolls. In some embodiments, the pellets are extruded through an annular die onto a sizing mandrel. According to this process, the pipe-like cross section that is extruded will be slit in one or more places and then flattened and handled as sheet. In some embodiments, the thermoplastic sheet is prepared by calendering. For calendering, resins and additives are plasticated between large rolls and then sized through a series of additional rolls into a flat sheet.

In some embodiments, the thermoplastic sheets are prepared by single layer flat sheet extrusion. In some embodiments, single layer flat sheet extrusion comprises (a) feeding resin into an extruder; (b) plasticating resin in a melt; (c) pumping the melted resin into a flat sheet die to size the sheet according to appropriate thickness and width; (d) advancing the semi-viscous sheet from the die through a series of rolls to cool; and (e) optionally winding the sheet onto continuous rolls or pre-shearing into discrete lengths. In some embodiments, multi-layer films are used in order to include packaging characteristics such as resistance to the passage of moisture and/or oxygen.

The thermoplastic sheet can be extruded in any thickness suitable for the expansion process disclosed herein. In some embodiments, the extruded thermoplastic sheet has a thickness of less than about 0.050 inches, less than about 0.045 inches, less than about 0.040 inches, less than about 0.035 inches, less than about 0.030 inches, less than about 0.025 inches, less than about 0.020 inches, less than about 0.015 inches, less than about 0.010 inches, or less than about 0.05 inches prior to expansion, including all ranges and values therebetween. In some embodiments, the thermoplastic sheet has a thickness ranging from about 0.005 inches to about 0.050 inches prior to expansion, e.g., about 0.005 inches, about 0.010 inches, about 0.015 inches, about 0.020 inches, about 0.025 inches, about 0.030 inches, about 0.035 inches, about 0.040 inches, about 0.045 inches, or about 0.050 inches, including all ranges and values therebetween. In some embodiments, the thermoplastic sheet has a thickness ranging from about 0.005 inches to about 0.025 inches prior to expansion. In still some embodiments, the thermoplastic sheet has a thickness ranging from about 0.005 inches to about 0.015 inches prior to expansion. In some embodiments, the thermoplastic sheet has a thickness ranging from about 0.015 inches to about 0.020 inches prior to expansion. In some embodiments, the thermoplastic sheet has a thickness ranging from about 0.020 inches to about 0.030 inches prior to expansion.

In some embodiments, an extruded thermoplastic sheet suitable for production of a bag has a thickness of about 0.009 inches, about 0.008 inches, about 0.007 inches, about 0.006 inches, about 0.005 inches, about 0.004 inches, about 0.003 inches, about 0.002 inches, about 0.001 inches, including all ranges and values therebetween. In some embodiments, the thickness of the extruded thermoplastic sheet is about 0.002 inches to about 0.009 inches, e.g., about 0.002 inches, about 0.003 inches, about 0.004 inches, about 0.005 inches, about 0.006 inches, about 0.007 inches, about 0.008 inches, or about 0.009 inches, including all ranges and values therebetween. In some embodiments, the thickness is about 0.009 inches.

In some embodiments, an extruded thermoplastic sheet suitable for production of a food service or food container product such as a plate, tray, or a clamshell container has a thickness of about 0.030 inches, about 0.029 inches, about 0.028 inches, about 0.027 inches, about 0.026 inches, about 0.025 inches, about 0.024 inches, about 0.023 inches, about 0.022 inches, about 0.021 inches, about 0.020 inches, about 0.019 inches, about 0.018 inches, about 17 inches, about 0.016 inches, about 0.015 inches, about 0.014 inches, about 0.013 inches, about 0.012 inches, about 0.011 inches, or about 0.010 inches, including all ranges and values therebetween. In some embodiments, the thickness of the extruded thermoplastic sheet is about 0.015 inches to about 0.020 inches, including all ranges and values therebetween. In some embodiments, the thickness is about 0.018 inches.

In some embodiments, an extruded thermoplastic sheet suitable for production of cutlery has a thickness of about 0.030 inches, about 0.029 inches, about 0.028 inches, about 0.027 inches, about 0.026 inches, about 0.025 inches, about 0.024 inches, about 0.023 inches, about 0.022 inches, about 0.021 inches, about 0.019 inches, about 0.018 inches, about 0.017 inches, about 0.016 inches, or about 0.015 inches, including all ranges and values therebetween. In some embodiments, the thickness of the extruded thermoplastic sheet is about 0.020 inches to about 0.025 inches, including all ranges and values therebetween. In some embodiments, the thickness is about 0.024 inches.

In some embodiments, an extruded thermoplastic sheet suitable for production of a cup has a thickness of about 0.030 inches, about 0.029 inches, about 0.028 inches, about 0.027 inches, about 0.026 inches, about 0.025 inches, about 0.024 inches, about 0.023 inches, about 0.022 inches, about 0.021 inches, about 0.020 inches, about 0.019 inches, about 0.018 inches, about 0.017 inches, about 0.016 inches, about 0.015 inches, about 0.014 inches, about 0.013 inches, about 0.012 inches, about 0.011 inches, or about 0.010 inches, including all ranges and values therebetween. In some embodiments, the thickness of the extruded thermoplastic sheet is about 0.016 inches to about 0.020 inches, including all ranges and values therebetween. In some embodiments, the thickness is less than about 0.016 inches, e.g., about 0.015 inches, about 0.014 inches, about 0.012 inches, about 0.011 inches, or about 0.010 inches, including all ranges and values therebetween.

One objective of the present disclosure is to provide a process of forming expanded plastic products comprised of environmentally friendly (e.g., compostable and/or biodegradable) materials. Accordingly, in some embodiments, the thermoplastic used in the process disclosed herein is a bioplastic. Examples of bioplastics suitable for use include, but are not limited to, polylactic acid (PLA) and a class of polymers known as polyhydroxyalkanoates (PHA). PHA polymers include polyhydroxybutyrates (PHB), polybutylene succinate (PBS) polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like. In some embodiments, the bioplastic is polylactic acid (PLA). In some embodiments, the PLA comprises pure (>99.5) L-lactic acid. In some embodiments, the PLA contains nontrivial amounts of D-lactic acid. In some embodiments, the amount of D-lactic acid (D-lactide) in the PLA is less than about 5%, less than about 4%, less than about 3%, less than about 2%, or less than about 1%. In some embodiments, the amount of D-lactic acid (D-lactide) in the PLA is about 1.3% to about 1.5%. In some embodiments, the amount of D-lactic acid (D-lactide) in the PLA is about 1% to about 6%, e.g., about 1% about 1.3%, about 1.5%, about 2%, about 2.5%, about 3%, about 3.5%, about 4%, about 4.5%, about 5%, about 5.5%, including all ranges and values therebetween.

For the purposes of this disclosure, PLA with less than about 2% D-lactic acid is termed "low-D PLA." In some embodiments, the low-D PLA is commercially available PLA having a D-isomer specification of 1.2% min to 1.6% max. Examples of low-D PLA are Ingeo™ Biopolymer 4032D from NatureWorks, the Technical Data Sheet of which (NW4032DGEN 051815V1) is herein incorporated by reference in its entirety and Luminy® LX575 from Total-Corbion, the Product Data Sheet of which (version 2/0976-EN) is herein incorporated by reference in its entirety. In some embodiments, the low-DPLA has an average molecular weight in the range of about 130,000 Da to about 250,000 Da, including all ranges and values therebetween. In some embodiments, the low-DPLL has an average molecular weight of about 200,000 Da.

For the purposes of this disclosure, PLA with more than about 2% D-lactic acid is termed "Generic PLA." In some embodiments, the generic PLA contains 4-6% D-isomers such as the commercially available Ingeo™ Biopolymer 2003D from NatureWorks, the Technical Data Sheet of which (NW2003D_051915V1) is herein incorporated by reference in its entirety and Luminy® LX175 from Total-Corbion, the Product Data Sheet of which (version 2/0976-EN) is herein incorporated by reference in its entirety. In some embodiments, the PLA has an average molecular weight of about 300,000 Da, and with D-lactic acid in the range of about 4% to about 6%, including all ranges and values therebetween. In some embodiments, the PLA may be commonly referred to as extrusion PLA injection molding PLA, thermoforming PLA or any other suitable name. The average molecular weight of various grades of PLA may be as low as approximately 50,000 or as high as 950,000.

In some embodiments, the polylactic acids described herein comprise up to about 20% filler. A non-limiting list of fillers suitable for use in the present disclosure includes talc, algae, wood pulp, starch, carbon black, graphite or another solid filler, such as a pigment, bagasse, or natural fibers that are biodegradable or does not interfere with degradation. In some embodiments, the filler degrades more readily than solid PLA and enables degradation in a period of less than 30 days in a compost environment. In some embodiments, the filler may include a chain extender.

In some embodiments, the thermoplastic is PET, PP, PC, TPU, or PE plastic. In some embodiments, the bioplastic is non-petroleum produced PET, PP, PC, TPU, or PE plastic, e.g., produced from biomass. In some embodiments, the thermoplastic is bio-polypropylene. In some embodiments, the thermoplastic is a non-bioplastic, i.e., a petroleum based plastic.

Saturation

In various embodiments, the extruded thermoplastic (e.g., sheet, roll, etc.) is contacted by a plasticizing gas in a pressure vessel, chamber, or other suitable device at a first temperature and a first pressure for a first time period to provide at least a partially saturated solid-state thermoplastic impregnated with the plasticizing gas. Non-limiting examples of a suitable device for saturating the thermoplastic are disclosed in U.S. Pat. No. 10,322,561, herein incorporated by reference in its entirety. In some embodiments, saturation of the thermoplastic sheet is a continuous process that improves the efficiency and cost-effectiveness of the method. In various embodiments, a thermoplastic (e.g., a thermoplastic sheet) is advanced though a chamber at a rate and length to establish a residence time suitable for generating an impregnated thermoplastic having a desirable level of gas absorption. Elements such as temperature, pressure, and sheet properties can be controlled in order to provide penetration of the plasticizing gas to various depths (e.g., just below the surface) and with certain profiles.

In some embodiments, the contacting of the thermoplastic occurs at first pressure of no more than 1,500 psi. In some embodiments, the contacting occurs at a first pressure ranging from about 700 psi to about 1,500 psi, e.g., about 700 psi, about 725 psi, about 750 psi, about 775 psi, about 800 psi, about 825 psi, about 850 psi, about 875 psi, about 900 psi, about 925 psi, about 950 psi, about 975 psi, about 1,000 psi, about 1,025 psi, about 1,050 psi, about 1,075 psi, about 1,100 psi, about 1,125 psi, about 1,150 psi, about 1,175 psi, about 1,200 psi, about 1,225 psi, about 1,250 psi, about 1,275 psi, about 1,300 psi, about 1,325 psi, about 1,350 psi, about 1,375 psi, about 1,400 psi, about 1,425 psi, about 1,450 psi, about 1,475 psi, or about 1,500 psi, including all ranges and values therebetween. In some embodiments, the contacting occurs at a first pressure ranging from about 700 psi to about 1,100 psi. In some embodiments, the contacting occurs at a first pressure ranging from about 800 psi to about 1,000 psi. In some embodiments, the contacting occurs at a first pressure of about 900 psi to about 1,000 psi. In some embodiments, the first pressure is about 950 psi. In some embodiments, the first pressure is about 900 psi.

The first temperature can be any temperature that at the give first pressure maintains the thermoplastic in the solid state. In some embodiments, the first temperature ranges from about 8° C. to about 48° C., e.g., about 8° C., about 10° C., about 12° C., about 14° C., about 16° C., about 18° C., about 20° C., about 22° C., about 24° C., about 26° C., about 28° C., about 30° C., about 32° C., about 34° C., about 36° C., about 38° C., about 40° C., about 42° C., about 44° C., about 46° C., about 48° C., or about 50° C., including all ranges and values therebetween. In some embodiments, the first temperature is from about 20° C. to about 32° C. In some embodiments, the first temperature is from about 22° C. to about 30° C. In some embodiments, the first temperature is from about 24° C. to about 30° C. In some embodiments, the first temperature is from about 26° C. to about 30° C. In some embodiments, the first temperature is from about 26° C. to about 28° C. In some embodiments, the first temperature is about 28° C.

In some embodiments, the contacting occurs at a first pressure ranging from about 800 psi to about 1,000 psi and a first temperature ranging from about 20° C. to about 32° C. In some embodiments, the first temperature ranges from about 24° C. to about 30° C. and the first pressure ranges from about 800 psi to about 1,000 psi. In some embodiments, the first temperature ranges from about 28° C. to about 30° C. and the first pressure ranges from about 800 psi to about 1,000 psi. In some embodiments, the first temperature is about the room temperature and the first pressure is about 900 psi.

The contacting of the thermoplastic with a plasticizer gas is for a first time period sufficient to provide at least a partially saturated solid thermoplastic impregnated with the plasticizing gas. In addition to the pressure of plasticizing gas supplied, this amount of time will depend on factors such as the sheet thickness, temperature of the thermoplastic sheet, and crystallinity of the thermoplastic sheet prior to expansion, as well as the amount of gas absorption desired for a particular application. In some embodiments, the contacting of a thermoplastic having the properties disclosed herein with a plasticizing gas occurs for a first time period of about 20 minutes or less. In some embodiments, the first time period is about 20 minutes, about 19 minutes, about 18 minutes, about 17 minutes, about 16 minutes, about 15 minutes, about 14 minutes, about 13 minutes, about 12 minutes, about 11 minutes, about 10 minutes, about 9 minutes, about 8 minutes, about 7 minutes, about 6 minutes, about 5 minutes, about 4 minutes, about 3 minutes, about 2 minutes, or about 1 minute, including all ranges and values therebetween. In some embodiments, the contacting of a thermoplastic having the properties disclosed herein with a plasticizing gas occurs for a first time period of about 10 seconds to about 20 minutes, including all ranges and values therebetween. In some embodiments, the first time period is about 0.5 minutes (30 seconds) to about 5 minutes, e.g., about 0.5 minutes, about 0.75 minutes, about 1 minute, about 1.25 minutes, about 1.55 minutes, about 1.75 minutes, about 2 minutes, about 2.25 minutes, about 2.5 minutes, about 2.75 minutes, about 3 minutes, about 3.25 minutes, about 3.5 minutes, about 3.75 minutes, about 4 minutes, about 4.25 minutes, about 4.5 minutes, about 4.75 minutes, or about 5 minutes, including all ranges and values therebetween. In some embodiments, the time is for about 1 minute, about 2 minutes, about 3 minutes, about 4 minutes, or about 5 minutes. In some embodiments, the contacting with a plasticizing gas is for a time of about 2 minutes. In some embodiments, the contacting time is for about 0.5 minutes. In some embodiments, the contacting time is between about 15 seconds and about 45 seconds.

In some embodiments, the contacting of the thermoplastic with the plasticizing gas provides a super-saturated thermoplastic impregnated with plasticizing gas. In some embodiments, the contacting of the thermoplastic with the plasticizing gas provides a fully saturated thermoplastic. In some embodiments, the contacting of the thermoplastic with the plasticizing gas provides a partially saturated thermoplastic at equilibrium. In some embodiments, saturation only occurs at the outside surface of the thermoplastic, e.g., the outside surface of a thermoplastic sheet. Without being bound by any particular theory, it is believed that a small amount of diffusion enables fewer, larger cells to form on the inside of the thermoplastic, while highly, well saturated surfaces expand as more crowded smaller multicellular regions. In some embodiments, the contacting results in at least a portion of the plasticizing gas being in an outer region of the impregnated thermoplastic. In some embodiments, the contacting results in at least a portion of the plasticizing gas being in an inner region of the impregnated thermoplastic. In related embodiments, the contacting results in a substantially greater amount of plasticizing gas in an outer region of the impregnated thermoplastic than in an inner region of the impregnated thermoplastic.

In some embodiments, the plasticizing gas is a gas or one or more gases that are inert under the process conditions. In some embodiments, the plasticizing gas is carbon dioxide ($CO_2$) and nitrogen ($N_2$). In some embodiments, the plasticizing gas is carbon dioxide ($CO_2$) or nitrogen ($N_2$). In some embodiments, the plasticizing gas is carbon dioxide ($CO_2$).

Heat Flux Control

The present disclosure describes the surprising and unexpected finding that controlling heat flux as described herein results in the formation of expanded thermoplastics with distinct microstructures, crystallinity, and expansion features that are responsible for improved physical and mechanical performance. These distinct features resulting in improved properties can be achieved for a wide range of molecular weights.

In some embodiments, controlling heat flux according to the disclosed methods includes one or more stages (i.e., one, two, three, etc.) of heating the impregnated thermoplastic. In some embodiments, controlling heat flux according to the disclosed methods includes multiple stages (i.e., two or more) of heating the impregnated thermoplastic. In some embodiments, controlling heat flux further includes one or more stages of cooling the impregnated thermoplastic. The stages of heating and cooling can be in any sequence useful in improving the performance characteristics of the thermoplastic, as would be understood by a skilled operator. In some embodiments, formation of expanded thermoplastics may include exposing a thermoplastic to a first heat flux for a first time period and a second heat flux for a second time period. In some embodiments, exposing to a first heat flux may involve exposing a thermoplastic to steam or water vapor and exposing to a second heat flux may involve advancing a thermoplastic in a water bath. In some embodiments, the first heat flux can be from about 105,000 $W/m^2$ to about 360,000 $W/m^2$ and the second heat flux can be from about 1,900 $W/m^2$ to about 22,800 $W/m^2$. In some embodiments, exposing to a first heat flux may involve exposing a thermoplastic to hot air and exposing to a second heat flux may involve advancing a thermoplastic in a water bath. In some embodiments, the first heat flux can be from about 1,250 $W/m^2$ to about 450,000 $W/m^2$ and the second heat flux can be from about 3,300 $W/m^2$ to about 39,600 $W/m^2$. In some embodiments, the second heat flux may even be from about 10 times to about 100 times larger than the aforementioned values due to larger heat transfer rates that may result from churning water and where churning may further increase due to $CO_2$ exiting the surface of the thermoplastic. In yet other embodiments, a first heat flux or a second heat flux may range from about 1,000 $W/m^2$ to about 500,000 $W/m^2$.

In some embodiments, heat flux control optionally includes cooling the impregnated thermoplastic at a second temperature and a second pressure for a second time period, the second pressure being lower than the first pressure.

In some embodiments, the second temperature is from about 0° C. to about 10° C., e.g., about 0° C., about 1° C., about 2° C., about 3° C., about 4° C., about 5° C., about 6° C., about 7° C., about 8° C., about 9° C., or about 10° C., including all ranges and values therebetween. In some embodiments, cooling at the second temperature reduces the temperature of the impregnated thermoplastic to less than about 10° C. In some embodiments, the cooling at the second temperature reduces the temperature of the impregnated thermoplastic to a temperature from about 0° C. to about 10° C. e.g., about 0° C., about 1° C., about 2° C., about 3° C., about 4° C., about 5° C., about 6° C., about 7° C., about 8° C., about 9° C., or about 10° C., including all ranges and values therebetween. In some embodiments, cooling is provided by exposing the thermoplastic to cold water (e.g., by placing the thermoplastic in a cold-water bath). In some embodiments, the methods disclosed herein can be conducted without a cooling step. In some embodiments, the second temperature can be at or near room temperature. In some embodiments, the second time period is essentially 0 seconds. In some embodiments, this occurs when the first temperature and the second temperature are essentially equivalent. In this case, the thermoplastic can be immediately subjected to heating at the third temperature after exposure to the first temperature.

In some embodiments, the second pressure is atmospheric (i.e., ambient) pressure. In related embodiments, the atmospheric pressure is from about 10 psi to about 30 psi, e.g., about 10 psi, about 11 psi, about 12 psi, about 13 psi, about 14 psi, about 15 psi, about 16 psi, about 17 psi, about 18 psi, about 19 psi, 20 psi to about 21 psi, 22 psi, about 23 psi, about 24 psi, about 25 psi, about 26 psi, about 27 psi, about 28 psi, about 29 psi, or about 30 psi, including all ranges and values therebetween.

The second time period refers to the amount of time the impregnated thermoplastic is subjected to the second temperature. In some embodiments, the second time period is from about 5 seconds to about 20 minutes, e.g., about 5 seconds, about 30 seconds, about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, about 15 minutes, about 16 minutes, about 17 minutes, about 18 minutes, about 19 minutes, or about 20 minutes, including all ranges and values therebetween. In some embodiments, the cooling is for a second time period of about 10 minutes. In some embodiments, the cooling is for a second time period of about 5 minutes. In some embodiments, cooling is for a second time period less than about 10 minutes. In some embodiments, cooling is for a second time period less than about 5 minutes.

In some embodiments, cooling at the second temperature for the second time period enables control of plasticizing gas desorption from the impregnated thermoplastic. In some embodiments, the cooling of the thermoplastic to the second temperature for the second time period prevents desorption of the plasticizing gas from the impregnated thermoplastic. In some embodiments, the cooling of the thermoplastic to the second temperature for the second time period results in minimal (e.g., <5% or <10%) desorption of the plasticizing gas from the impregnated thermoplastic. In some embodiments, the cooling of the thermoplastic to the second temperature for the second time period can result in less than about 10%, less than about 9%, less than about 8%, less than about 7%, less than about 6%, less than about 5%, less than about 4%, less than about 3%, less than about 2%, or less than about 1% desorption of the plasticizing gas from the impregnated thermoplastic. In some embodiments, cooling at the second temperature for a second time period simultaneously controls the amount of crystallinity that occurs between saturation and expansion. Cooling to accommodate a suppressed glass transition temperature (Tg) can prevent excessive crystallization that may have adverse effects during expansion.

In some embodiments, the cooling at the second temperature for a second period of time permits plasticizing gas trapped at the surface to migrate deeper into the thermoplastic sheet. Accordingly, in some embodiments, the cooling at the second temperature for the second time period increases the amount of plasticizing gas in an inner region of the thermoplastic sheet.

Without being bound by any particular theory, it is proposed herein that small amounts of plasticizing gas (e.g., $CO_2$) reaching further penetration depths may be responsible for larger void/cell formation later during processing—since fewer crystals and expansion forces are restricting cell expansion, larger, elongated cell formation is possible. These types of cells can lead to expanded thermoplastics having lower density, which in turn reduces the amount of material needed to generate products of adequate strength and insulation and hence drives down cost. In addition, these types of cells lead to potentially faster compostability as they expose more surface area to composting factors once the material is ruptured. Furthermore, lower density, and hence reduced amount of material content, of expanded thermoplastics contribute to speeding up the composting time. For example, materials prepared according to the methods described herein are found to compost about 2.5 times faster than non-expanded, PLA.

As described above, the disclosed methods further include exposing the impregnated thermoplastic to a third temperature for a third time period no longer than 20 seconds; the third temperature being greater than the second temperature, and within a range that substantially prevents or limits desorption of the plasticizing gas from the thermoplastic.

In some embodiments, the third time period is from about 5 seconds to about 5 minutes, e.g., about 5 seconds, about 30 seconds, about 1 minute, about 1.5 minutes, about 2 minutes, about 2.5 minutes, about 3 minutes, about 3.5 minutes, about 4 minutes, about 4.5 minutes, or about 5 minutes, including all ranges and values therebetween. In some embodiments, the cooling is for a third time period of less than about 5 minutes. In some embodiments, the cooling is for a third time period less than about 1 minute. In some embodiments, the cooling is for a third time period of about 60 seconds, about 50 seconds, about 40 seconds, about 30 seconds, about 20 seconds, or about 10 seconds. In some embodiments, the cooling is for a third time period is for about 10 seconds.

In some embodiments, the third time period is essentially 0 seconds. In some embodiments, this occurs when the second temperature and the third temperature are equivalent. In this case, the cooled thermoplastic can be immediately subjected to heating at the fourth temperature.

In some embodiments, the third temperature is from about 5° C. to about 40° C., e.g., about 5° C., about 10° C., about 15° C., about 20° C., about 25° C., about 30° C., about 35° C., or about 40° C., including all ranges and values therebetween. In some embodiments, the third temperature is about 20° C. to about 30° C. In some embodiments, the third temperature is about 25° C.

In some embodiments, exposing the impregnated thermoplastic to the third temperature for the third time period increases the temperature of the impregnated thermoplastic by about 1° C., by about 2° C., by about 3° C., by about 4° C., by about 5° C., by about 6° C., by about 7° C., by about 8° C., by about 9° C., by about 10° C., by about 11° C., by about 12° C., by about 13° C., by about 14° C., by about 15° C., by about 16° C., by about 17° C., by about 18° C., by about 19° C., or by about 20° C., including all ranges and values therebetween. In some embodiments, exposing the impregnated thermoplastic to the third temperature increases the temperature of the impregnated thermoplastic by about 1° C. to about 10° C. In still some embodiments, the temperature of the impregnated thermoplastic increases by about 1° C. to about 5° C. In some embodiments, exposing the impregnated thermoplastic to the third temperature increases the temperature of the impregnated thermoplastic by less than 5° C.

In some embodiments, exposing the thermoplastic to the third temperature for the third time period results in desorption of no more than about 30% of the plasticizing gas from the impregnated thermoplastic. In some embodiments, exposing the thermoplastic to the third temperature for the third time period results in desorption of no more than about 20% of the plasticizing gas from the impregnated thermoplastic. In still some embodiments, exposing the thermoplastic to the third temperature for the third time period results in desorption of no more than about 10% of the plasticizing gas from the impregnated thermoplastic. In some embodiments, exposing the thermoplastic to the third temperature for the third time period results in desorption of no more than about 5% of the plasticizing gas from the impregnated thermoplastic.

The methods of the present disclosure further include heating the impregnated thermoplastic to a fourth temperature greater than the third temperature for a fourth time period no longer than 30 seconds to remove no more than a portion of the plasticizing gas from the impregnated thermoplastic. This stage of the heat flux control process constitutes a pre-heating of the impregnated thermoplastic prior to full expansion.

In some embodiments, the fourth temperature is less than about 85° C., less than about 75° C., less than about 65° C., less than about 55° C., less than about 45° C., or less than about 35° C., including all ranges and values therebetween.

In some embodiments, heating at the fourth temperature for the fourth time period comprises subjecting the impregnated thermoplastic to steam or water vapor from a water bath maintained from about 90° C. to about 98° C. In some embodiments, heating at the fourth temperature involves free convection or forced convection. In some embodiments, heating at the fourth temperature involves infrared heating.

In some embodiments, the fourth time period is from about 0.1 seconds to 60 seconds, e.g., about 0.1 to 1 seconds, about 1 to 5 seconds, about 5 seconds, about 10 seconds, about 15 seconds, about 20 seconds, about 25 seconds, about 30 seconds, about 35 seconds, about 40 seconds, about 45 seconds, about 50 seconds, about 55 seconds, or about 60 seconds, including all ranges and values therebetween. In some embodiments, the heating is for a fourth time period no more than about 5 seconds to about 30 seconds, e.g., no more than about 5 seconds, no more than about 7.5 seconds, no more than about 10 seconds, no more than about 12.5 seconds, no more than about 15 seconds, no more than about 17.5 seconds, no more than about 20 seconds, no more than about 22.5 seconds, no more than about 25 seconds, no more than about 27.5 seconds, or no more than about 30 seconds, including all ranges and values therebetween. In some embodiments, the heating is for a fourth time period less than about 15 seconds. In some embodiments, the heating is for a fourth time period of about 5 seconds to about 15 seconds, including all ranges and values therebetween. In some embodiments, the heating is for a fourth time period is for about 10 seconds.

In some embodiments, exposing the impregnated thermoplastic to the fourth temperature for the fourth time increases the temperature of the impregnated thermoplastic by about 1° C., by about 2° C., by about 3° C., by about 4° C., by about 5° C., by about 6° C., by about 7° C., by about 8° C., by about 9° C., by about 10° C., by about 11° C., by about 12° C., by about 13° C., by about 14° C., by about 15° C., by about 16° C., by about 17° C., by about 18° C., by about 19° C., by about 20° C., by about 22° C., by about 22° C., by about 23° C., by about 24° C., by about 25° C., by about 26° C., by about 27° C., by about 28° C., by about 29° C., by about 30° C., by about 31° C., by about 32° C., by about 33° C., by about 34° C., by about 35° C., by about 36° C., by about 37° C., by about 38° C., by about 39° C., or by about 40° C., including all ranges and values therebetween. In some embodiments, exposing the impregnated thermoplastic to the fourth temperature increases the temperature of the impregnated thermoplastic by about 1° C. to about 10° C., including all ranges and values therebetween. In still some embodiments, the temperature of the impregnated thermoplastic increases by about 1° C. to about 5° C. In some embodiments, exposing the impregnated thermoplastic to the fourth temperature increases the temperature of the impregnated thermoplastic by less than 5° C.

As the temperature of the thermoplastic begins to increase, desorption of some of the plasticizing gas from the sheet can occur. In some embodiments, desorption of at least a portion of the plasticizing gas includes desorption of about 2%, about 4%, about 6%, about 8%, about 10%, about 12%, about 14%, about 16%, about 20%, about 22%, about 24%, about 26%, about 28%, or about 30% of the plasticizing gas by weight, including all ranges and values therebetween.

In some embodiments, heating at the fourth temperature for the fourth time period increases the crystallinity of the impregnated thermoplastic. In some embodiments, the crystallinity is increased by about 1% to about 25%, e.g., about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25%, including all ranges and values therebetween.

In some embodiments, the crystallinity of the impregnated thermoplastic heated at the fourth temperature for the fourth time period is about 10% to about 30%, e.g., about 10%, about 12%, about 14%, about 16%, about 18%, about 20%, about 22%, about 24%, about 26%, about 28%, or about 30%, including all ranges and values therebetween. In some embodiments, the crystallinity is about 20% to about 30%, including all ranges and values therebetween.

In some embodiments, the heating at the fourth temperature for the fourth time period results in expansion of the impregnated thermoplastic. In some embodiments, the thermoplastic expands in thickness by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%, including all ranges and values therebetween. In some embodiments, thermoplastic expands in thickness by at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, or at least about 20%, including all ranges and values therebetween.

In some embodiments, the third and the fourth heating stages may be combined into a single heating stage.

Expansion

To obtain expanded thermoplastics having the desirable performance characteristics, the present method includes the step of expanding the impregnated thermoplastic by heating the impregnated thermoplastic at a fifth temperature, the fifth temperature being greater than the fourth temperature and sufficient to promote rapid desorption of the plasticizing gas, thereby resulting in the formation of a low-density expanded thermoplastic.

In some embodiments, fifth temperature is from about 85° C. to about 98° C., e.g., about 85° C., about 86° C., about 87° C., about 88° C., about 89° C., about 90° C., about 91° C., about 92° C., about 93° C., about 94° C., about 95° C., about 96° C., about 97° C., or about 98° C., including all ranges and values therebetween. In some embodiments, the fifth temperature is about 95° C. In some embodiments, the fifth temperature is about 98° C. In some embodiments, the fifth temperature is just below the boiling point of water. In some embodiments, the fifth temperature is at or just above the boiling point of water. In some embodiments, expanding the impregnated thermoplastic by heating the impregnated thermoplastic at a fifth temperature may involve advancing it in a water bath.

In some embodiments, heating the impregnated thermoplastic at the fifth temperature further increases the crystallinity of the expanded thermoplastic. In some embodiments, the crystallinity is increased by about 1% to about 45%, e.g., about 1%, about 3%, about 6%, about 9%, about 12%, about 15%, about 18%, about 21%, about 24%, about 27%, about 30%, about 33%, about 36%, about 39%, about 42%, or about 45%, including all ranges and values therebetween. In some embodiments, the crystallinity is increased by about 1% to about 25%, including all ranges and values therebetween.

In some embodiments, heating the impregnated thermoplastic at the fifth temperature provides an expanded thermoplastic having a crystallinity of about 25% to about 75%, e.g., about 25%, about 27.5%, about 30%, about 32.5%, about 35%, about 37.5%, about 40%, about 42.5%, about 45%, about 47.5%, about 50%, about 52.5%, about 55%, about 57.5%, about 60%, about 62.5%, about 65%, about 67.5%, about 70%, about 72.5%, or about 75%, including all ranges and values therebetween. In some embodiments, the crystallinity of the expanded thermoplastic is about 30% to about 65%. In some embodiments, the crystallinity of the expanded thermoplastic is about 30% to about 45%. In some embodiments, the crystallinity is about 30%. In some embodiments, the crystallinity is about 35%. In some embodiments, the crystallinity is about 40%. In some embodiments, the crystallinity is about 45%. In some embodiments, the crystallinity is about 50%. In some embodiments, the crystallinity is about 55%. In some embodiments, the crystallinity is about 60%. In some embodiments, the crystallinity is about 65%.

In some embodiments, the heating at the fifth temperature results in expansion of the impregnated thermoplastic. In some embodiments, the thermoplastic expands in thickness by about 10%, about 20%, about 30%, about 40%, about 50%, about 60%, about 70%, about 80%, about 90%, about 100%, about 110%, about 120%, about 130%, about 140%, about 150%, about 160%, about 170%, about 180%, about 190%, about 200%, about 210%, about 220%, about 230%, about 240%, about 250%, about 260%, about 270%, about 280%, about 290%, about 300%, about 310%, about 320%, about 330%, about 340%, about 350%, about 360%, about 370%, about 380%, about 390%, or about 400%, including all ranges and values therebetween. In some embodiments, thermoplastic expands in thickness by at least about 5%, at least about 25%, at least about 50%, at least about 75%, at least about 100%, at least about 125%, at least about 150%, at least about 175%, or at least about 200%, including all ranges and values therebetween.

In some embodiments, the expanded thermoplastic expands by about 0.5 times, by about 1 time, by about 1.5 times, by about 2 times, by about 2.5 times, by about 3 times, by about 3.5 times, by about 4 times, by about 4.5 times, by about 5 times, by about 5.5 times, by about 6 times, by about 6.5 times, by about 7 times, by about 7.5 times, by about 8 times, by about 8.5 times, by about 9 times, by about 9.5 times, or by about 10 times the thickness of the thickness of the extruded thermoplastic sheet prior to expansion.

In some embodiments, the expanded thermoplastic sheet expands by at least about 5%, by at least about 10%, by at least about 15%, by at least about 20%, by at least about 25%, by at least about 30%, by at least about 35%, by at least about 40%, by at least about 45%, by at least about 50%, by at least about 55%, by at least about 60%, by at least about 65%, by at least about 70%, by at least about 75%, by at least about 80%, by at least about 85%, by at least about 90%, by at least about 95%, or by at least about 100%, including all ranges and values therebetween, relative to the extruded thermoplastic sheet prior to expansion.

In some embodiments, the expanded thermoplastic sheet expands by at least about 25%, by at least about 50%, by at least about 75%, by at least about 100%, by at least about 125%, by at least about 150%, by at least about 175%, by at least about 200%, by at least about 225%, by at least about 250%, by at least about 275%, by at least about 300%, by at least about 325%, by at least about 350%, by at least about 375%, by at least about 400%, by at least about 425%, by at least about 450%, by at least about 475%, or by at least about 500%, including all ranges and values therebetween, relative to the extruded thermoplastic sheet prior to expansion.

In some embodiments, expansion results in the formation of a thermoplastic sheet having multiple regions. In some embodiments, the multiple regions are two or more regions. In some embodiments, the multiple regions are three or more regions. In some embodiments, the multiple regions are four or more regions. In some embodiments, the multiple regions are five or more regions.

In some embodiments, the multiple regions of the thermoplastic sheet include a first outer region, a second outer region, and an inner region disposed between the first outer region and the second outer region. In some embodiments, the first outer region and the second outer region of the expanded thermoplastic have a thickness of about 125 μm to about 225 μm, including all ranges and values therebetween. In some embodiments, the first outer region and the second outer region of the expanded thermoplastic have a thickness of about 150 μm to about 200 μm, including all ranges and values therebetween. In some embodiments, the first outer region and the second outer region of the expanded thermoplastic have a thickness of about 150 μm, about 155 μm, 160 μm, about 165 μm, 170 μm, about 175 μm, 180 μm, about 185 μm, 190 μm, about 200 μm, about 205 μm, about 210 μm, about 215 μm, about 220 μm, or about 225 μm, including all ranges and values therebetween.

In some embodiments, the first outer region and the second outer region include cells having a dimension of about 100 μm or less, about 95 μm or less, 90 μm or less, about 85 μm or less, 80 μm or less, about 75 μm or less, 70 μm or less, about 65 μm or less, about 60 μm or less, about 55 μm or less, or about 50 μm or less, including all ranges and values therebetween. In some embodiments, the first outer region and the second outer region include cells having a dimension of about 75 μm or less. In some embodiments, the first outer region and the second outer region include cells having a dimension of about 20 μm to about 80 μm, e.g., about 20 μm, about 25 μm, about 30 μm, about 35 μm, about 40 μm, about 45 μm, about 50 μm, about 55 μm, about 60 μm, about 65 μm, about 70 μm, about 75 μm, or about 80 μm, included all ranges and values therebetween. In some embodiments, the first outer region and the second outer region include cells having a dimension of about 25 μm to about 75 μm.

In some embodiments, the first outer region and the second outer region include cells having a length to width aspect ratio of about 1:2, about 1:1.5, about 1:1, about 1.5:1, or about 2:1, including all ranges and values therebetween.

In some embodiments, the inner region has a thickness of about 1,000 μm to about 2,000 μm, the inner region including cells having a dimension of at least 50 μm. In some embodiments, the inner region has a thickness of about 1,000 μm, about 1,050 μm, about 1,100 μm, about 1,150 μm, about 1,200 μm, about 1,250 μm, about 1,300 μm, about 1,350 μm, about 1,400 μm, about 1,450 μm, about 1,500 μm, about 1,550 μm, about 1,600 μm, about 1,650 μm, about 1,700 µm, about 1,750 µm, about 1,800 µm, about 1,850 µm, about 1,900 µm, about 1,950 µm, or about 2,000 µm, including all ranges and values therebetween. In some embodiments, the inner region has a thickness of about 1,500 µm.

In some embodiments, the cells of the inner region are elongated cells. In some embodiments, the inner region includes cells having a length to width aspect ratio of at least 2:1, of at least 3:1, at least 4:1, or at least 5:1. In some embodiments, the length to width aspect ratio is about 3:1. In some embodiments, the length to width aspect ratio is about 4:1.

In some embodiments, the inner region includes cells having a dimension of at least about 100 µm, at least about 95 µm, at least about 90 µm, at least about 85 µm, at least about 80 µm, at least about 75 µm, at least about 70 µm, at least about 65 µm, at least about 60 µm, at least about 55 µm, or at least about 50 µm, including all ranges and values therebetween.

In some embodiments, the inner region includes cells having a length of about 200 µm to about 800 µm, e.g., about 200 µm, about 225 µm, about 250 µm, about 275 µm, about 300 µm, about 325 µm, about 350 µm, about 375 µm, about 400 µm, about 425 µm, about 450 µm, about 475 µm, about 400 µm, about 425 µm, about 450 µm, about 475 µm, about 500 µm, about 525 µm, about 550 µm, about 575 µm, about 600 µm, about 625 µm, about 650 µm, about 675 µm, about 700 µm, about 725 µm, about 750 µm, about 775 µm, or about 800 µm, including all ranges and values therebetween.

In some embodiments, the inner region includes cells having a width of about 50 µm to about 200 µm, e.g., about 50 µm, about 55 µm, about 60 µm, about 65 µm, about 70 µm, about 75 µm, about 80 µm, about 85 µm, about 90 µm, about 95 µm, about 100 µm, about 105 µm, about 110 µm, about 115 µm, about 120 µm, about 125 µm, about 130 µm, about 135 µm, about 140 µm, about 145 µm, about 150 µm, about 155 µm, about 160 µm, about 165 µm, about 170 µm, about 175 µm, about 180 µm, about 185 µm, about 190 µm, about 195 µm, or about 200 µm, including all ranges and values therebetween.

In some embodiments, the cells of the inner region have a length to width dimension of from about 200 µm to about 800 µm by about 50 µm to about 200 µm. In some embodiments, the inner cells have a length to width dimensions of about 200 µm by about 50 µm. In some embodiments, the inner cells have a length to width dimensions of about 300 µm by about 75 µm. In some embodiments, the inner cells have a length to width dimensions of about 400 µm by about 100 µm. In some embodiments, the inner cells have a length to width dimensions of about 500 µm by about 125 µm. In some embodiments, the inner cells have a length to width dimensions of about 600 µm by about 150 µm. In some embodiments, the inner cells have a length to width dimensions of about 700 µm by about 175 µm. In some embodiments, the inner cells have a length to width dimensions of about 800 µm by about 200 µm.

Without being bound by any particular theory, control over heat flux during heated expansion provides a window of operating conditions that imparts desired microstructures, crystallinity, and physical expansion features that are desirable for strength-to-weight and thermal resistance.

The desorption of plasticizing gas from the thermoplastic that produces cells with the above properties provides expanded materials with reduced density. In some embodiments, the expansion that occurs by heating at the fifth temperature reduces the density of the expanded thermoplastic by at least about 10%, by at least about 25%, by at least about 30%, by at least about 35%, by at least about 40%, by at least about 45%, or by at least about 50%, including all ranges and values therebetween. In some embodiments, the density of the expanded thermoplastic is reduced by at least about 10%. In some embodiments, the density of the expanded thermoplastic is reduced by at least about 20%.

In some embodiments, the density of the expanded thermoplastic is about 0.05 g/cc to about 0.25 g/cc, e.g., about 0.05 g/cc, about 0.10 g/cc, about 0.15 g/cc, about 0.20 g/cc, or about 0.25 g/cc, including all ranges and values therebetween. In some embodiments, the density of the expanded thermoplastic is about 0.10 g/cc to about 0.2 g/cc. In some embodiments, the density of the expanded thermoplastic is less than about 0.2 g/cc. In some embodiments, the density of the expanded thermoplastic is less than about 0.1 g/cc. In some embodiments, the density of the expanded thermoplastic is about 0.12 g/cc. In some embodiments, the density of the expanded thermoplastic is about 0.2 g/cc.

In some embodiments, the expanded thermoplastic has a thickness of 0.020 inches to about 0.220 inches, e.g., about 0.020 inches, about 0.030 inches, about 0.040 inches, about 0.050 inches, about 0.060 inches, about 0.070 inches, about 0.080 inches, about 0.090 inches, about 0.100 inches, about 0.110 inches, about 0.120 inches, about 0.130 inches, about 0.140 inches, about 0.150 inches, about 0.160 inches, about 0.170 inches, about 0.180 inches, about 0.190 inches, about 0.200 inches, about 0.210 inches, about 0.220 inches, including all ranges and values therebetween.

Expanded Thermoplastics

Also described herein are thermoplastic sheets with unique microstructures and other physical properties useful for imparting desired performance characteristics.

Figure 3:
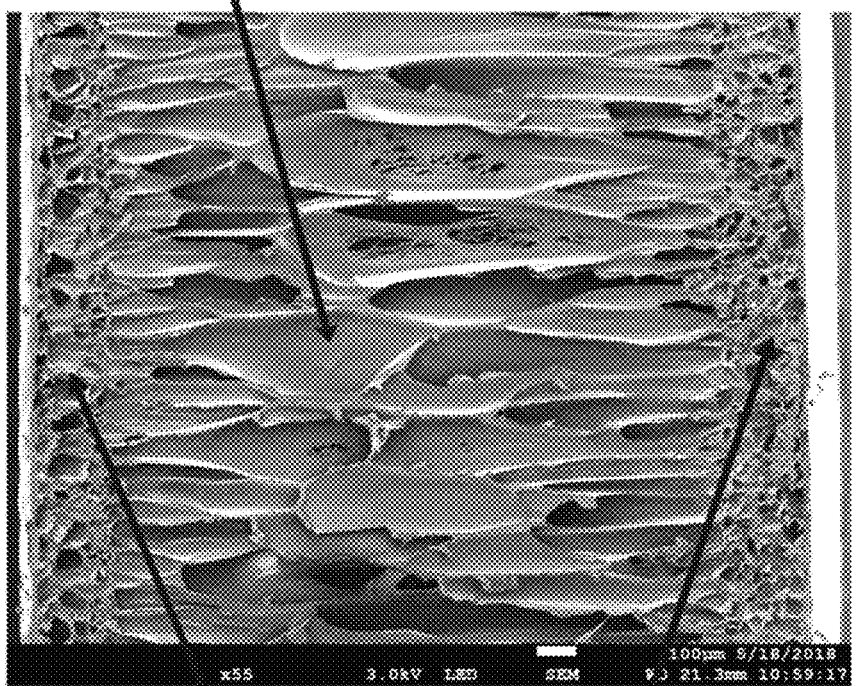
FIG. 3 provides a Scanning Electron Micrograph (SEM) image (at about 55 times magnification) of a cross-section (in-plane) image of a continuous, non-laminated, multilayered, cellular microstructure of an expanded thermoplastic sheet prepared from a low-D PLA material according to the methods described herein.

FIG. 3 shows a SEM image (at about 55 times magnification) of a cross-section (in-plane) image of a continuous, non-laminated, multilayered, cellular microstructure of an expanded thermoplastic sheet prepared from a low-D PLA material according to the methods described herein, where an inner region and outer regions, and microcells within the respective regions and their characteristics, are indicated.

In some embodiments, the present disclosure provides an expanded thermoplastic sheet, comprising a first outer region, a second outer region, and an inner region disposed between the first outer region and the second outer region. In some embodiments, the first outer region and the second outer region have a thickness of about 150 µm to about 200 µm. In some embodiments, the first outer region and the second outer region include cells having a dimension of about 75 µm or less. In some embodiments, the inner region has a thickness of about 1,000 µm to about 2,000 µm, the inner region including cells having a dimension of at least about 50 µm.

In some embodiments, the first outer region and the second outer region of the expanded thermoplastic have a thickness of about 125 µm to about 225 µm, including all ranges and values therebetween. In some embodiments, the first outer region and the second outer region of the expanded thermoplastic have a thickness of about 150 µm to about 200 µm, including all ranges and values therebetween. In some embodiments, the first outer region and the second outer region of the expanded thermoplastic have a thickness of about 150 µm, about 155 µm, 160 µm, about 165 µm, 170 µm, about 175 µm, 180 µm, about 185 µm, 190 µm, about 200 µm, about 205 µm, about 210 µm, about 215 µm, about 220 µm, or about 225 µm, including all ranges and values therebetween.

In some embodiments, the first outer region and the second outer region include cells having a dimension of about 100 μm or less, about 95 μm or less, 90 μm or less, about 85 μm or less, 80 μm or less, about 75 μm or less, 70 μm or less, about 65 μm or less, about 60 μm or less, about 55 μm or less, or about 50 μm or less, including all ranges and values therebetween. In some embodiments, the first outer region and the second outer region include cells having a dimension of about 75 μm or less. In some embodiments, the first outer region and the second outer region include cells having a dimension of about 20 μm to about 80 μm, e.g., about 20 μm, about 25 μm, about 30 μm, about 35 μm, about 40 μm, about 45 μm, about 50 μm, about 55 μm, about 60 μm, about 65 μm, about 70 μm, about 75 μm, or about 80 μm, included all ranges and values therebetween. In some embodiments, the first outer region and the second outer region include cells having a dimension of about 25 μm to about 75 μm.

In some embodiments, the first outer region and the second outer region include cells having a length to width aspect ratio of about 1:2, about 1:1.5, about 1:1, about 1.5:1, or about 2:1, including all ranges and values therebetween.

In some embodiments, the inner region has a thickness of about 1,000 μm to about 2,000 μm, the inner region including cells having a dimension of at least 50 μm. In some embodiments, the inner region has a thickness of about 1,000 μm, about 1,050 μm, about 1,100 μm, about 1,150 μm, about 1,200 μm, about 1,250 μm, about 1,300 μm, about 1,350 μm, about 1,400 μm, about 1,450 μm, about 1,500 μm, about 1,550 μm, about 1,600 μm, about 1,650 μm, about 1,700 μm, about 1,750 μm, about 1,800 μm, about 1,850 μm, about 1,900 μm, about 1,950 μm, or about 2,000 μm, including all ranges and values therebetween. In some embodiments, the inner region has a thickness of about 1,500 μm.

In some embodiments, the cells of the inner region are elongated cells. In some embodiments, the inner region includes cells have a length to width aspect ratio of at least 2:1, of at least 3:1, at least 4:1, or at least 5:1. In some embodiments, the length to width aspect ratio is about 3:1. In some embodiments, the length to width aspect ratio is about 4:1.

In some embodiments, the inner region includes cells having a dimension of at least about 100 μm, at least about 95 μm, at least about 90 μm, at least about 85 μm, at least about 80 μm, at least about 75 μm, at least about 70 μm, at least about 65 μm, at least about 60 μm, at least about 55 μm, or at least about 50 μm, including all ranges and values therebetween.

In some embodiments, the inner region includes cells having a length of about 200 μm to about 800 μm, e.g., about 200 μm, about 225 μm, about 250 μm, about 275 μm, about 300 μm, about 325 μm, about 350 μm, about 375 μm, about 400 μm, about 425 μm, about 450 μm, about 475 μm, about 400 μm, about 425 μm, about 450 μm, about 475 μm, about 500 μm, about 525 μm, about 550 μm, about 575 μm, about 600 μm, about 625 μm, about 650 μm, about 675 μm, about 700 μm, about 725 μm, about 750 μm, about 775 μm, or about 800 μm, including all ranges and values therebetween.

In some embodiments, the inner region includes cells having a width of about 50 μm to about 200 μm, e.g., about 50 μm, about 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, about 150 μm, about 155 μm, about 160 μm, about 165 μm, about 170 μm, about 175 μm, about 180 μm, about 185 μm, about 190 μm, about 195 μm, or about 200 μm, including all ranges and values therebetween.

In some embodiments, the cells of the inner region have a length to width dimension of from about 200 μm to about 800 μm by about 50 μm to about 200 μm. In some embodiments, the inner cells have a length to width dimension of about 200 μm by about 50 μm. In some embodiments, the inner cells have a length to width dimension of about 300 μm by about 75 μm. In some embodiments, the inner cells have a length to width dimension of about 400 μm by about 100 μm. In some embodiments, the inner cells have a length to width dimension of about 500 μm by about 125 μm. In some embodiments, the inner cells have a length to width dimension of about 600 μm by about 150 μm. In some embodiments, the inner cells have a length to width dimension of about 700 μm by about 175 μm. In some embodiments, the inner cells have a length to width dimension of about 800 μm by about 200 μm.

In some embodiments, the expanded thermoplastic sheet further comprises a transition region (or layer) between the outer region and the inner region. In some embodiments, formation of the transition region is due to the multiple heat fluxes and expansion times/rates. In some embodiments, the transition region or layer can have a thickness of at least about 0.1 mm, at least about 0.11 mm, at least about 0.12 mm, at least about 0.13 mm, at least about 0.14 mm, at least about 0.15 mm, at least about 0.16 mm, at least about 0.17 mm, at least about 0.18 mm, at least about 0.19 mm, at least about 0.2 mm, at least about 0.21 mm, at least about 0.22 mm, at least about 0.23 mm, or at least about 0.24 mm, inclusive of all ranges and values therebetween. In some embodiments, the transition region or layer can have a thickness of no more than about 0.25 mm, no more than about 0.24 mm, no more than about 0.23 mm, no more than about 0.22 mm, no more than about 0.21 mm, no more than about 0.2 mm, no more than about 0.19 mm, no more than about 0.18 mm, no more than about 0.17 mm, no more than about 0.16 mm, no more than about 0.15 mm, no more than about 0.14 mm, no more than about 0.13 mm, no more than about 0.12 mm, no more than about 0.11 mm, inclusive of all ranges and values therebetween. In some embodiments, the transition region or layer can have a thickness of about 0.15 mm to about 0.18 mm.

In some embodiments, the transition region or layer can include cells with a cell diameter of at least about 20 microns, at least about 30 microns, at least about 40 microns, at least about 50 microns, at least about 60 microns, at least about 70 microns, at least about 80 microns, at least about 90 microns, at least about 100 microns, at least about 110 microns, at least about 120 microns, at least about 130 microns, or at least about 140 microns, inclusive of all ranges and values therebetween. In some embodiments, the transition region or layer can include cells with a cell diameter of no more than about 150 microns, no more than about 140 microns, no more than about 130 microns, no more than about 120 microns, no more than about 110 microns, no more than about 100 microns, no more than about 90 microns, no more than about 80 microns, no more than about 70 microns, no more than about 60 microns, no more than about 50 microns, no more than about 40 microns, or no more than about 30 microns, inclusive of all ranges and values therebetween. In some embodiments, the transition region or layer can include cells with a cell diameter of about 40 to about 110 microns.

Figure 4A:
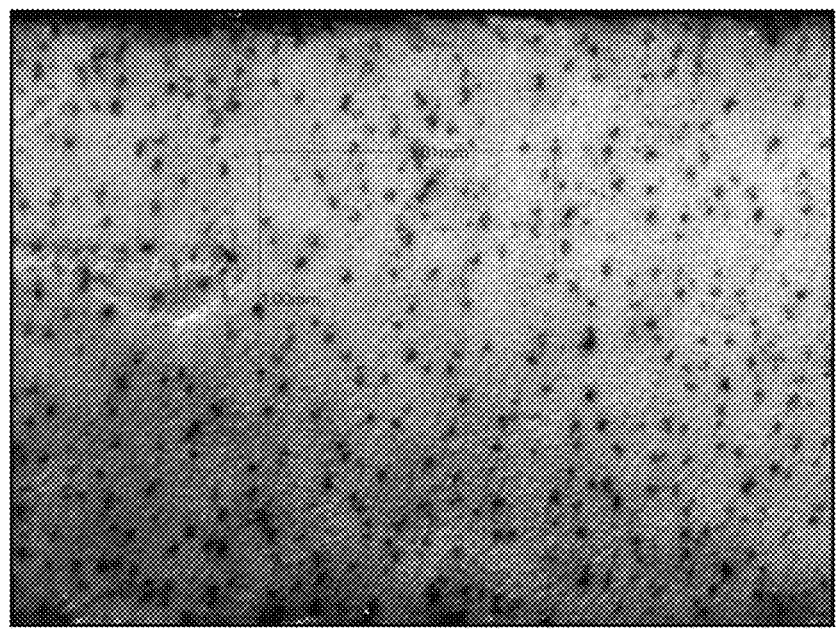
FIGS. 4A and 4B provide optical microscopy images of surface micropores of the expanded thermoplastic sheet prepared according to methods disclosed herein at 4× magnification and 10× magnification, respectively.
Figure 4B:
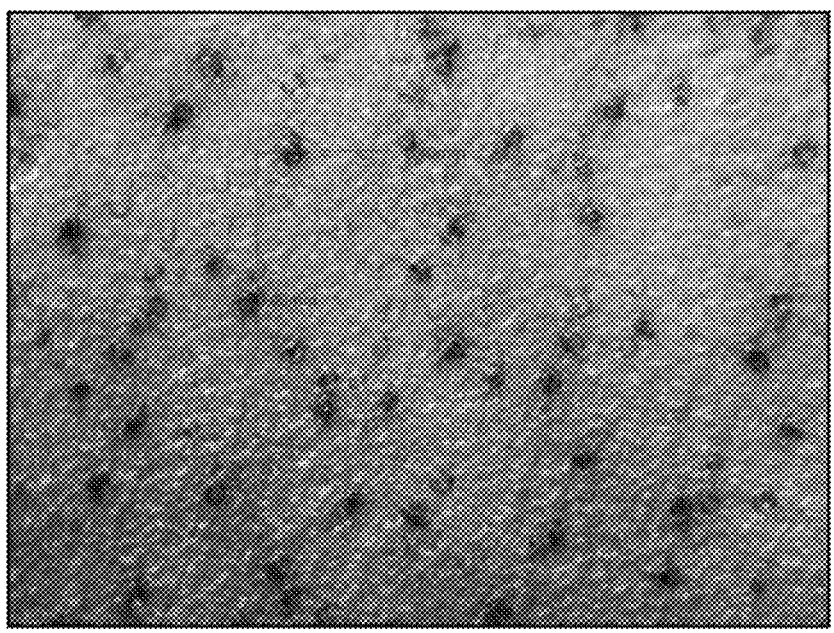

In some embodiments, the expanded thermoplastic sheet prepared according to the method disclosed herein has surface micropores adjacent with the dense microcellular structure in the outer regions immediately under them. FIGS. 4A and 4B show optical microscopy images (with 4× and 10× magnification) of surface micropores of the expanded thermoplastic sheet prepared according to an embodiment described herein, using the low-D PLA, where the openings of the micropores have enabled the ink from the dyne pen to penetrate and concentrate in them. In some embodiments, there are about 30,000 to about 60,000 surface pores per square inch. In some embodiments, as shown in FIGS. 4A and 4B, there are about 44,000 surface pores per square inch. The processing methods of using high pressures for brief periods of time may be an important factor in generating a fine-celled structure of cells near the surface of the part, given the porosity induced during processing. A sample with large cells through its entire structure and surface pores would enable leakage of package contents through the exterior wall. Early processing experiments generated a number of "leaky" containers. In some embodiments, the diameter of the surface pores can be less than about 50 micrometers. In some embodiments, the surface pores do not penetrate more than about 100 micrometers into the depth of the part.

In some embodiments, the expanded thermoplastic has a density that is reduced by at least about 10%, by at least about 25%, by at least about 30%, by at least about 35%, by at least about 40%, by at least about 45%, or by at least about 50%, including all ranges and values therebetween. In some embodiments, the expanded thermoplastic has a density that is reduced by at least about 10%. In some embodiments, the expanded thermoplastic has a density that is reduced by at least about 20%.

In some embodiments, the expanded thermoplastic has a density of about 0.05 g/cc to about 0.25 g/cc, e.g., about 0.05 g/cc, about 0.10 g/cc, about 0.15 g/cc, about 0.20 g/cc, or about 0.25 g/cc, including all ranges and values therebetween. In some embodiments, the expanded thermoplastic has a density of about 0.10 g/cc to about 0.2 g/cc. In some embodiments, the expanded thermoplastic has a density less than about 0.2 g/cc. In some embodiments, the expanded thermoplastic has a density less than about 0.1 g/cc. In some embodiments, the expanded thermoplastic has a density of about 0.12 g/cc. In some embodiments, the expanded thermoplastic has a density of about 0.2 g/cc.

In some embodiments, the expanded thermoplastic has a crystallinity of at least about 25%, at least about 27.5%, at least about 30%, at least about 32.5%, at least about 35%, at least about 37.5%, at least about 40%, at least about 42.5%, at least about 45%, at least about 50%, at least about 52.5%, at least about 55%, at least about 57.5%, at least about 60%, at least about 62.5%, at least about 65%, at least about 67.5%, at least about 70%, at least about 72.5%, or at least about 75%. In some embodiments, the expanded thermoplastic has a crystallinity of about 25% to about 75%, e.g., about 25%, about 27.5%, about 30%, about 32.5%, about 35%, about 37.5%, about 40%, about 42.5%, about 45%, about 50%, about 52.5%, about 55%, about 57.5%, about 60%, about 62.5%, about 65%, about 67.5%, about 70%, about 72.5%, or about 75%, including all ranges and values therebetween. In some embodiments, the expanded thermoplastic has a crystallinity of about 30% to about 65%. In some embodiments, the expanded thermoplastic has a crystallinity of about 30% to about 45%. In some embodiments, the expanded thermoplastic has a crystallinity of about 30%. In some embodiments, the expanded thermoplastic has a crystallinity of about 35%. In some embodiments, the expanded thermoplastic has a crystallinity of about 40%. In some embodiments, the expanded thermoplastic has a crystallinity of about 45%. In some embodiments, the expanded thermoplastic has a crystallinity of about 50%. In some embodiments, the expanded thermoplastic has a crystallinity of about 55%. In some embodiments, the expanded thermoplastic has a crystallinity of about 60%. In some embodiments, the expanded thermoplastic has a crystallinity of about 65%.

In some embodiments, the expanded thermoplastic has a thickness of 0.020 inches to about 0.220 inches, e.g., about 0.020 inches, about 0.030 inches, about 0.040 inches, about 0.050 inches, about 0.060 inches, about 0.070 inches, about 0.080 inches, about 0.090 inches, about 0.100 inches, about 0.110 inches, about 0.120 inches, about 0.130 inches, about 0.140 inches, about 0.150 inches, about 0.160 inches, about 0.170 inches, about 0.180 inches, about 0.190 inches, about 0.200 inches, about 0.210 inches, about 0.220 inches, including all ranges and values therebetween.

The expanded thermoplastics described herein have improved physical and mechanical properties, which can be measured according to a variety of tests known to one of skill in the art.

In some embodiments, the expanded thermoplastic has a flexural strength of about 0.2 MPa to about 100 MPa, e.g., about 0.2 MPa, about 1.0 MPa, about 5.0 MPa, about 10.0 MPa, about 15.0 MPa, about 20.0 MPa, about 25.0 MPa, about 30.0 MPa, about 35.0 MPa, about 40.0 MPa, about 45.0 MPa, about 50.0 MPa, about 55.0 MPa, about 60.0 MPa, about 65.0 MPa, about 70.0 MPa, about 75.0 MPa, about 80.0 MPa, about 85.0 MPa, about 90.0 MPa, about 95.0 MPa, or about 100.0 MPa, including all ranges and values therebetween, as measured by an ASTM C78 test. In some embodiments, the expanded thermoplastic has a flexural strength of about 0.2 MPa to about 10 MPa, about 0.2 MPa to about 20 MPa, about 0.2 MPa to about 30 MPa, about 0.2 MPa to about 40 MPa, about 0.2 MPa to about 50 MPa, about 0.2 MPa to about 60 MPa, about 0.2 MPa to about 70 MPa, about 0.2 MPa to about 80 MPa, about 0.2 MPa to about 90 MPa, or about 0.2 MPa to about 100 MPa, including all ranges and values therebetween. In some embodiments, flexural strength is alternatively measured according to the ASTM D638 test.

In some embodiments, the expanded thermoplastic has a tensile strength of about 0.2 MPa to about 50 MPa, e.g., about 0.2 MPa, about 2.0 MPa, about 4.0 MPa, about 6.0 MPa, about 8.0 MPa, about 10.0 MPa, about 12.0 MPa, about 14.0 MPa, about 16.0 MPa, about 18.0 MPa, about 20.0 MPa, about 22.0 MPa, about 24.0 MPa, about 26.0 MPa, about 28.0 MPa, about 30.0 MPa, about 32.0 MPa, about 34.0 MPa, about 36.0 MPa, about 38.0 MPa, about 40.0 MPa, about 42.0 MPa, about 44.0 MPa, about 46.0 MPa, about 48.0 MPa, or about 50.0 MPa, including all ranges and values therebetween, as measured by an ASTM C78 test. In some embodiments, the expanded thermoplastic has a tensile strength of about 0.2 MPa to about 10 MPa, about 0.2 MPa to about 20 MPa, about 0.2 MPa to about 30 MPa, about 0.2 MPa to about 40 MPa, about 0.2 MPa to about 50 MPa, about 0.2 MPa to about 60 MPa, about 0.2 MPa to about 70 MPa, about 0.2 MPa to about 80 MPa, about 0.2 MPa to about 90 MPa, or about 0.2 MPa to about 100 MPa, including all ranges and values therebetween. In some embodiments, tensile strength is alternatively measured according to the ASTM D638 test.

In some embodiments, the expanded thermoplastic has a shear strength of about 0.2 MPa to about 50 MPa, e.g., about 0.2 MPa, about 2.0 MPa, about 4.0 MPa, about 6.0 MPa, about 8.0 MPa, about 10.0 MPa, about 12.0 MPa, about 14.0

MPa, about 16.0 MPa, about 18.0 MPa, about 20.0 MPa, about 22.0 MPa, about 24.0 MPa, about 26.0 MPa, about 28.0 MPa, about 30.0 MPa, about 32.0 MPa, about 34.0 MPa, about 36.0 MPa, about 38.0 MPa, about 40.0 MPa, about 42.0 MPa, about 44.0 MPa, about 46.0 MPa, about 48.0 MPa, or about 50.0 MPa, including all ranges and values therebetween, as measured by an ASTM C78 test. In some embodiments, shear strength is alternatively measured according to the ASTM D638 test.

In some embodiments, the thermoplastic is a thermoplastic sheet. In some embodiments, the thermoplastic is a bioplastic. In some embodiments, the bioplastic is polylactic acid. In some embodiments, the thermoplastic is PET plastic. In some embodiments, the bioplastic is non-petroleum PET plastic, (e.g., produced from biomass). In some embodiments, the thermoplastic is a non-bioplastic (e.g., thermoplastic polyurethane).

The expanded thermoplastics described herein may be used in industries including, but not limited to, for example, food, medical, and healthcare, sporting goods, heating and cooling, aircraft/aerospace, construction, and automotive industries, where the specific characteristics of the expanded thermoplastics described herein can be leveraged in meeting corresponding industrial requirements.

Thermoforming

The expanded thermoplastics described herein can be thermoformed by any suitable method, including those disclosed herein, to produce as variety of industrially useful products in industries including for example food, medical and healthcare, and aircraft and automotive industries, where products may be single-use or durable products. In automotive applications, for example, material that is appropriate for being near a hot engine on one side and near a relatively cooler metal on the other side may be desirable, similar to that for the single-use hot food containers in food industry applications.

Thermoforming is the process of heating a material to its forming temperature and applying force to the hot material to push it into cavities or over a mold so that the material conforms to the shape of the mold. The forces applied may be generated through mechanical means (plugs), vacuum, or air pressure. For most molds, plugs force the material into the mold cavities, vacuum draws the plastic over the mold and into the cavities, and air pressure is applied to move the material into the custom mold cavities. The relatively high crystallinity of the sheet induced by crystallization during saturation and also strain-induced crystallization during expansion may enable higher sheet forming temperatures than those enabled by traditional foam methods. These relatively high pressures enable the use of single-sided tooling with air pressure on a single side of the parts. The high sheet temperature may increase the gas pressure inside the cells temporarily, aiding in forming.

In some embodiments, the molding process in thermoforming is modified, by actively heating the mold, for improving the heat resistance and heat stability of the molded article according to its required service temperatures. This is sometimes referred to as "heatsetting". In some embodiments, heat resistance is improved by further increasing the crystallinity percentage of the expanded sheet by heating the mold to at least about 120° C., e.g., for low-D PLA. In some embodiments, the expanded PLA sheet is exposed to the heated mold for at least about 6 seconds to sufficiently increase the crystallinity percentage to withstand desired service temperatures.

The surprisingly high crystallinity percentage of the expanded sheet prepared according to the methods described herein is one of the main factors that is responsible from preserving the critical hierarchical layered microstructure, described herein, of the expanded sheet through thermoforming and heatsetting, especially thermoforming and heatsetting at surprisingly high temperatures, thus enabling the making of end products that can withstand surprisingly high service temperatures (e.g., about 105° C., e.g., boiling water, in some products described in the below and produced by the methods described herein) and at the same time enjoy the physical and performance benefits of the hierarchical layered microstructure such as sufficient strength at surprisingly thin form factors and at low densities.

In addition, thanks to high crystallinity, and also thanks to the preserved microstructure, there is no need to add a cold mold stage following the hot mold stage in order to "freeze" the foam prior to trimming because the formed and heatset product is rigid enough to be transferred to the trimming station immediately and at about room temperature, thus contributing to shorter production times (e.g., about 6 seconds to about 9 seconds, depending on the product) and requiring lesser number of production steps relative to prior art. At the trim station, the product is extracted by either a steel rule die or matched metal trim press. The remaining trim material may be collected and recycled back into the process to make more parts.

The high crystallinity of the expanded sheet is responsible from maintaining rigidity and preserving the critical hierarchical microstructure even during forming and heatsetting at surprisingly high temperatures. This high initial crystallinity is able to hold the hierarchical microstructure intact. During molding and heatsetting at high temperatures, the polymer chains gain energy and mobility and join existing crystals and/or form additional crystals thereby further increasing the overall crystallinity. As heatsetting temperatures increase beyond $T_g$ and move towards the melting temperature $T_m$ (where chains start to melt rather than crystallize) the chains move faster with higher mobility to rearrange and/or crystallize.

Another surprising advantage of the sufficiently high crystallinity percentage of the expanded sheet prepared according to the methods described herein is the margin for some potential loss in crystallinity percentage that may take place for various reasons during thermoforming without heatsetting, thus still preserving the hierarchical microstructure and its benefits in the end product, as can be seen in some of the example products, e.g., in shallow meat trays, plates and in some non-heatset deep products such as clamshells in the Example 4 in the following.

In some embodiments, a low-density formed product is provided, comprising: a non-laminated polymer sheet including a least 50% by weight of a thermoplastic material, the non-laminated polymer sheet having a first outer region, a second outer region, and an inner region disposed between the first outer region and the second outer region, the first outer region and the second outer region including cells having a dimension of at about 75 μm or less; the inner region including cells having a length to width aspect ratio of about 4:1, the inner layer having a dimension of at least 50 μm. In some embodiments, the low-density thermoformed product undergoes no substantial deformation when tested according to an ASTM D2126 test; and wherein the low-density thermoformed product shows no visible deformation when contacted with water at about 100° C. or less.

In some embodiments, the non-laminated polymer sheet includes at least about 50% by weight of a polylactic acid polymer material, at least about 60% by weight of a polylactic acid polymer material, at least about 70% by weight of a polylactic acid polymer material, at least about 80% by weight of a polylactic acid polymer material, or at least about 90% by weight of a polylactic acid polymer material, including all ranges and values therebetween.

In some embodiments, the low-density thermoformed products disclosed herein have a bending modulus (or flexural modulus) of about 0.2 MPa to about 4 GPa, including all ranges and values therebetween, when tested according the ASTM D790 three-point bend test. In some embodiments, the low-density thermoformed products disclosed herein have a bending modulus of about 0.2 MPa to about 10 MPA when tested according the ASTM D790 three-point bend test, e.g., about 5 MPa, about 10 MPa, about 15 MPa, about 20 MPa, about 25 MPa, about 30 MPa, about 35 MPa, about 40 MPa, about 45 MPa, about 50 MPa, about 55 MPa, about 60 MPa, about 65 MPa, or about 70 MPa, including all ranges or values therebetween. In some embodiments, the bending modulus is up to about 14 GPa.

In some embodiments, the low-density thermoformed products disclosed herein have a bend strength (or flexural strength) of 0.2 MPa to about 80 MPa, e.g., about 0.2 MPa, about 1.0 MPa, about 5.0 MPa, about 10.0 MPa, about 15.0 MPa, about 20.0 MPa, about 25.0 MPa, about 30.0 MPa, about 35.0 MPa, about 40.0 MPa, about 45.0 MPa, about 50.0 MPa, about 55.0 MPa, about 60.0 MPa, about 65.0 MPa, about 70.0 MPa, about 75.0 MPa, or about 80.0 MPa, including all ranges and values therebetween, when tested according the ASTM D790 three-point bend test. In some embodiments, the bend strength is up to about 145 MPa.

In some embodiments, the low-density thermoformed products disclosed herein resist deformation at a temperature greater than about 40° C., greater than about 45° C., greater than about 50° C., greater than about 55° C., greater than about 60° C., or greater than about 65° C. In some embodiments, these temperatures In some embodiments, the low-density thermoformed products disclosed herein resist deformation (e.g., warping, shrinking, etc.) when exposed to the ASTM D2126 test (standard test for response of rigid cellular plastics the thermal and humidity aging). In some embodiments, the low-density thermoformed products disclosed herein resist deformation when one or more surfaces of low-density thermoplastic is contacted with hot water. In some embodiments, the hot water is water at a temperature greater than about 60° C., greater than about 70° C., greater than about 80° C., greater than about 90° C., or greater than about 100° C., including all ranges and values therebetween. In some embodiments, the hot water is boiling water. In some embodiments, the low-density thermoformed products disclosed herein resist deformation when subjected to heating under microwave conditions with a food item contacting an inner surface of the low-density thermoformed product. In some embodiments, the food item is a solid or liquid food item.

In some embodiments, resistance to deformation includes warping of no more than about 1%, no more than about 2%, no more than about 3%, no more than about 4%, no more than about 5%, no more than about 6%, no more than about 7%, no more than about 8%, no more than about 9%, or no more than about 10%, including all ranges and values therebetween. In some embodiments, the amount of deformation after exposing the thermoplastic to the ASTM D1226 is about 1% to about 10%, e.g., about 1%, about 2%, about 3%, about 4%, about 5%, about 6%, about 7%, about 8%, about 9%, or about 10%. In some embodiments, the amount of deformation after exposing the thermoplastic to the ASTM D1226 is about 1% to about 5%.

In some embodiments, an expanded thermoplastic sheet suitable for production of a bag has a thickness of about 0.005 inches, about 0.010 inches, about 0.015 inches, about 0.020 inches, about 0.025 inches, about 0.030 inches, about 0.035 inches, about 0.040 inches, about 0.045 inches, about 0.050 inches, about 0.055 inches, about 0.060 inches, about 0.065 inches, or about 0.070 inches, including all ranges and values therebetween. In some embodiments, the thickness of the expanded thermoplastic sheet is about 0.005 inches to about 0.060 inches, e.g., about 0.005 inches, about 0.010 inches, about 0.015 inches, about 0.020 inches, about 0.025 inches, about 0.030 inches, about 0.035 inches, about 0.040 inches, about 0.045 inches, about 0.050 inches, about 0.055 inches, or about 0.060 inches, including all ranges and values therebetween. Accordingly, in some embodiments of the present method, the extruded thermoplastic sheet suitable for production of a bag expands from about 0.010 inches to about 0.020 inches to about 0.060 inches.

In some embodiments, an expanded thermoplastic sheet suitable for production of a plate has a thickness of about 0.045 inches, about 0.050 inches, about 0.055 inches, about 0.060 inches, about 0.065 inches, about 0.070 inches, about 0.075 inches, about 0.080 inches, about 0.085 inches, about 0.090 inches, about 0.095 inches, about 0.100 inches, about 0.105 inches, about 0.110 inches, about 0.115 inches, or about 0.120 inches, including all ranges and values therebetween. In some embodiments, the thickness of the expanded thermoplastic sheet is about 0.070 inches to about 0.110 inches, including all ranges and values therebetween. Accordingly, in some embodiments of the present method, the extruded thermoplastic sheet suitable for production of a plate expands from about 0.018 inches to about 0.070 inches to about 0.110 inches.

In some embodiments, an expanded thermoplastic sheet suitable for production of cutlery has a thickness of about 0.090 inches, about 0.100 inches, about 0.110 inches, about 0.120 inches, about 0.0130 inches, about 0.140 inches, about 0.150 inches, about 0.160 inches, about 0.170 inches, about 0.180 inches, about 0.190 inches, about 0.200 inches, or about 0.210 inches, including all ranges and values therebetween. In some embodiments, the thickness of the thermoplastic is about 0.090 inches to about 0.100 inches. In some embodiments, the thickness of the expanded thermoplastic sheet is about 0.150 inches to about 0.200 inches, including all ranges and values therebetween. Accordingly, in some embodiments of the present method, the extruded thermoplastic sheet suitable for production of cutlery expands from about 0.24 inches to about 0.150 inches to about 0.200 inches.

In some embodiments, an expanded thermoplastic sheet suitable for production of a cup has a thickness of about 0.060 inches, about 0.070 inches, about 0.080 inches, about 0.090 inches, about 0.100 inches, about 0.110 inches, about 0.120 inches, about 0.130 inches, about 0.140 inches, about 0.150 inches, about 0.160 inches, about 0.170 inches, about 0.180 inches, or about 0.190 inches, including all ranges and values therebetween. In some embodiments, the thickness of the expanded thermoplastic sheet is about 0.070 inches to about 0.180 inches, including all ranges and values therebetween. Accordingly, in some embodiments of the present method, the extruded thermoplastic sheet suitable for production of a cup expands from about 0.016 inches to about 0.070 inches to about 0.180 inches.

In some embodiments, the thermoformed products prepared by the disclosed methods have a weight per unit area of about 0.05 g/in² to about 0.2 g/in², including all ranges and values therebetween. In some embodiments, the expanded thermoplastics prepared by the disclosed methods have a weight per unit area of about 0.13 g/in² to about 0.19 g/in².

In some embodiments, the thermoformed products prepared according to the methods disclosed herein have surface micropores on the thermoformed products with a dense cellular structure underneath these surface micropores and in the outer regions where the dense microcellular structure prevents product failure and/or leaks. For example, surface pores may be larger on one side and the product, such as a food tray, a meat tray, a fruit tray, or a vegetable tray, may incorporate perforations so that the need for "blood pouch" for capturing fluid may be eliminated. In addition, the surface pores may support writing on the surface of the product or placing a label on the surface of the product. FIGS. 5A-C show optical microscopy images (with 10× magnification) of surface micropores of three different thermoformed products all prepared according to an embodiment described herein, using the low-D PLA, where the openings of the micropores have enabled the ink from the dyne pen to penetrate and concentrate in them. In some embodiments, there are about 30,000 to about 60,000 surface pores per square inch in thermoformed products. In some embodiments, as shown in FIGS. 5A-C, there are about 56,000 surface pores per square inch in FIG. 5A; from about 36,000 to about 41,000 surface pores in FIG. 5B; and from about 39,000 to about 46,000 surface pores in FIG. 5C.

Further, having a flat uniform surface and a dense rigid cellular structure permits the use of single-sided thermoforming tool which is more advantageous and economical than a double-sided thermoforming tool. The fact that the surface micropores are on a physical web and not an open cell (percolated structure) implies that a mold and filling system is not needed and there is no need to draw vacuum from both sides to fill and set the mold before product can be ejected, thereby resulting in a continuous process.

Products

The microstructures obtained according to the methods described herein enable unique features and result in differentiated cost, style, and functional advantages in the thermoformed products compared with existing products.

Thermoformed products according to the methods described herein are stronger, lighter, and thinner due to light weight core, having an oriented cardboard/honeycomb like structure with oriented cells through the plane of the material, and high tensile strength outer layer (due to high crystallinity, and more material at the outer regions—rounder cells). This outer layer provides strength when bending as outer radius is in tension and inner radius is in compression. However, the appropriate thickness, and the strength of the outer layer keep the core from buckling—again, analogous to corrugated materials with laminated surface with high stability and low weight. One resulting advantage of being thinner and stronger is the ability to fit more products, e.g., meat trays, in a box reducing shipping costs. In addition, due to higher heat resistance of products, such as meat trays, prepared according to the methods described herein, refrigerated shipping of empty products, e.g., empty meat trays, may not be required thus further reducing shipping costs. In some embodiments, meat trays prepared according to methods described herein may be heat stable up to 55-60° C., i.e., less than 10% warping of product dimensions at these temperatures. (See Example 4 for detailed specification of an example meat tray prepared using methods disclosed herein.)

The layered structure with the elongated cells, in the inner region of the microstructure of materials prepared according to the methods described herein, provides a tougher product. For example, when a meat tray fails due to overloading (e.g., 3 pt bend), it does not crack and rupture such as EPS foam. This is an advantage with plastic-film ("saran") wrapping products such as meat trays and mushroom tills, since in case of failure in the product the failed product does not contaminate the packaging process.

Edge-crushing during steel rule die trimming results in an aesthetically pleasant and functionally advantageous trim finish—different from standard edges in standard foam tray cuts with open pores and ragged edges that may enable moisture to infiltrate into the product.

Edge crushing collapses the cells at the edge and curls them over to result in a rounded finish. This is likely due to cells cold-working and closing the corrugated core, leveraging and using up the air space but retaining the outer layer strength. The collapse of the inner elongated cells is analogous to non-recoverable compliance of a corrugated structure. This is a significant factor in forming product elements such as hinges, e.g., in containers such as clamshells. It is unique and surprising that product elements like hinges may be formed without adding extra draw features to thin the product as it would be needed with solid sheet of similar magnitude of thickness as described in the prior art (see, for example, U.S. Pat. No. 5,413,239). The unique microstructure and crystallinity of products obtained according to the methods described herein enable the creation of localized, collapsed-cell compressed features that persist, without requiring any added heat unlike the products made from EPS and other foams. A compressed section or a feature, such as a compressed or indented line feature (or a channel or a crease), may be used to form a point of rotation with minimal or no deformation in its surrounding area. Two sections of a container, which are connected together with a hinge element including such compressed features, are free to rotate about the point of rotation.

The hinge element has a base structure having an upper and a lower surface connected with the top and the bottom of a container or an article, respectively. The base structure also comprises a compressed midsection formed during thermoforming, or thermoforming and trimming, that creates a directed creasing point for hinging. When the base structure is folded, forming a hinge, the upper and the lower surfaces fold towards each other to form a hinge of a one-piece container or an article. Upon thermoforming and trimming a container, the hinge element may not have a natural bias. Upon closing the container, a natural bias towards closure may persist. In some embodiments, the compressed midsection comprises one or more further compressed or indented line features as will be described in the below in Reference to FIGS. 6A and 6B.

Figure 6A:
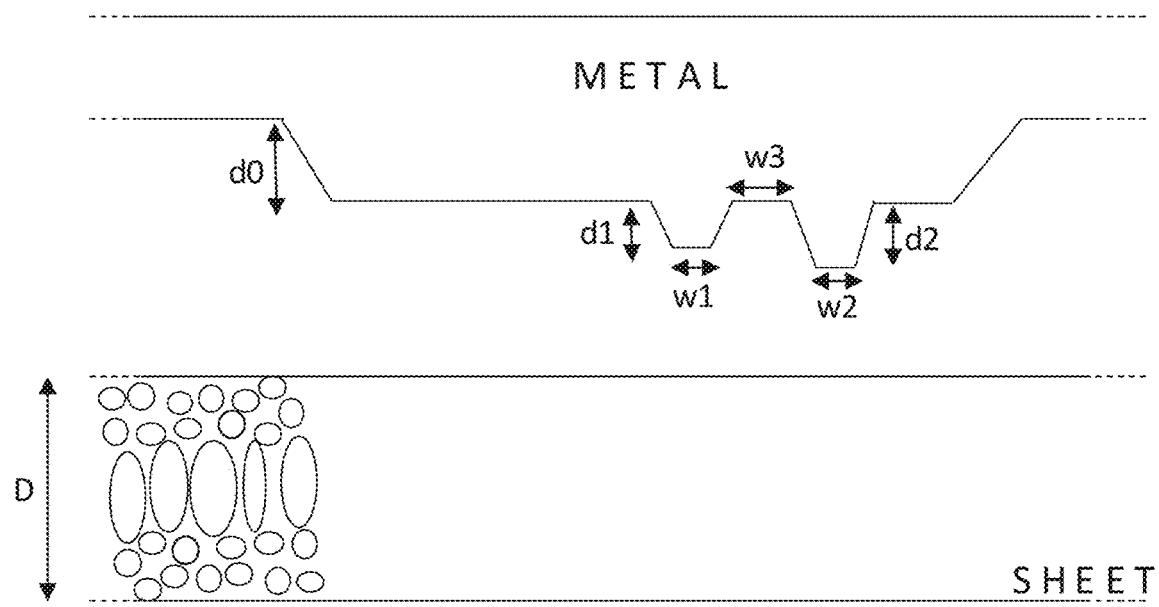
FIGS. 6A and 6B show a drawing of a hinge element of a product such as clamshell prepared according to methods disclosed herein in Pre-compression and Post-compression, respectively.
Figure 6B:
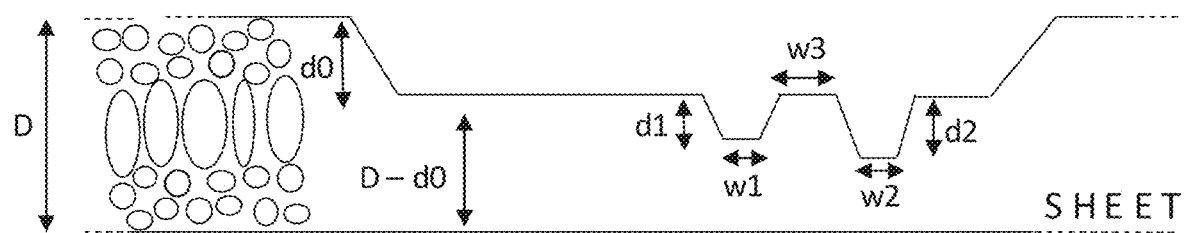

FIG. 6A shows a drawing of the expanded sheet used in forming e.g., a container product such as a clamshell, and the metal mold piece and its features, prior to compression before metal mold makes contact with the sheet. FIG. 6B shows the sheet after compression, and the base structure of a hinge element, where two indented line features formed on the sheet and on the base structure of the hinge are also depicted. In some embodiments, the thickness of the base structure of the hinge element of a container, depicted as D-d0 in FIG. 6B, may be in the range of about 0.025" to about 0.040", where the thickness of the expanded sheet used in forming the container may range from about 0.040" to about 0.100" or from about 0.065" to about 0.080". A hinge element may include one or more indented lines or channels in the base structure, as shown in FIG. 6B with widths and depths denoted by w1, w2, and d1, d2, respectively. In an embodiment, w1 is equal to about 0.040" and d1, corresponding to depth from the surface of the base structure, ranges from about 0.006" to about 0.0010" and w2=w1 and d2=d1. The dimension of the gap between the indented line features, depicted as w3 in FIG. 6B, may be about on the order of the dimension of the width of the indented line features, and it is determined, e.g., to prevent material bunching. The neighboring indented line features enable for more effective range of motion around the hinge rotation point without material binding, or collision, thus preventing a natural bias towards open, or preventing an unwanted container gap around the perimeter. Dimensions of multiple indented line features may be symmetric or asymmetric. In embodiments with symmetry, w1=w2 and d1=d2. In embodiments with asymmetry w1 is not equal to w2, and/or d1 is not equal to d2. FIGS. 6A and 6B show a drawing of an example embodiment with asymmetric features.

In a preferred non-limiting embodiment, two indented lines or channels are formed on top (inside) of a base structure where D is about 0.065", D-d0 is about 0.035", and the two adjacent channels are about 0.040" wide and about 0.008" deep, and are about 0.020" apart from each other, enabling sufficient clearance of material, and proper aesthetic profile and/or sealing when the article is in the closed position. This is not a limiting embodiment and may be presented in iterations of none or more channels, larger crease/channel dimensions, separation, or more asymmetric channel design for varying base structure thicknesses, and varying base structure thickness top/bottom independently.

Figure 7:
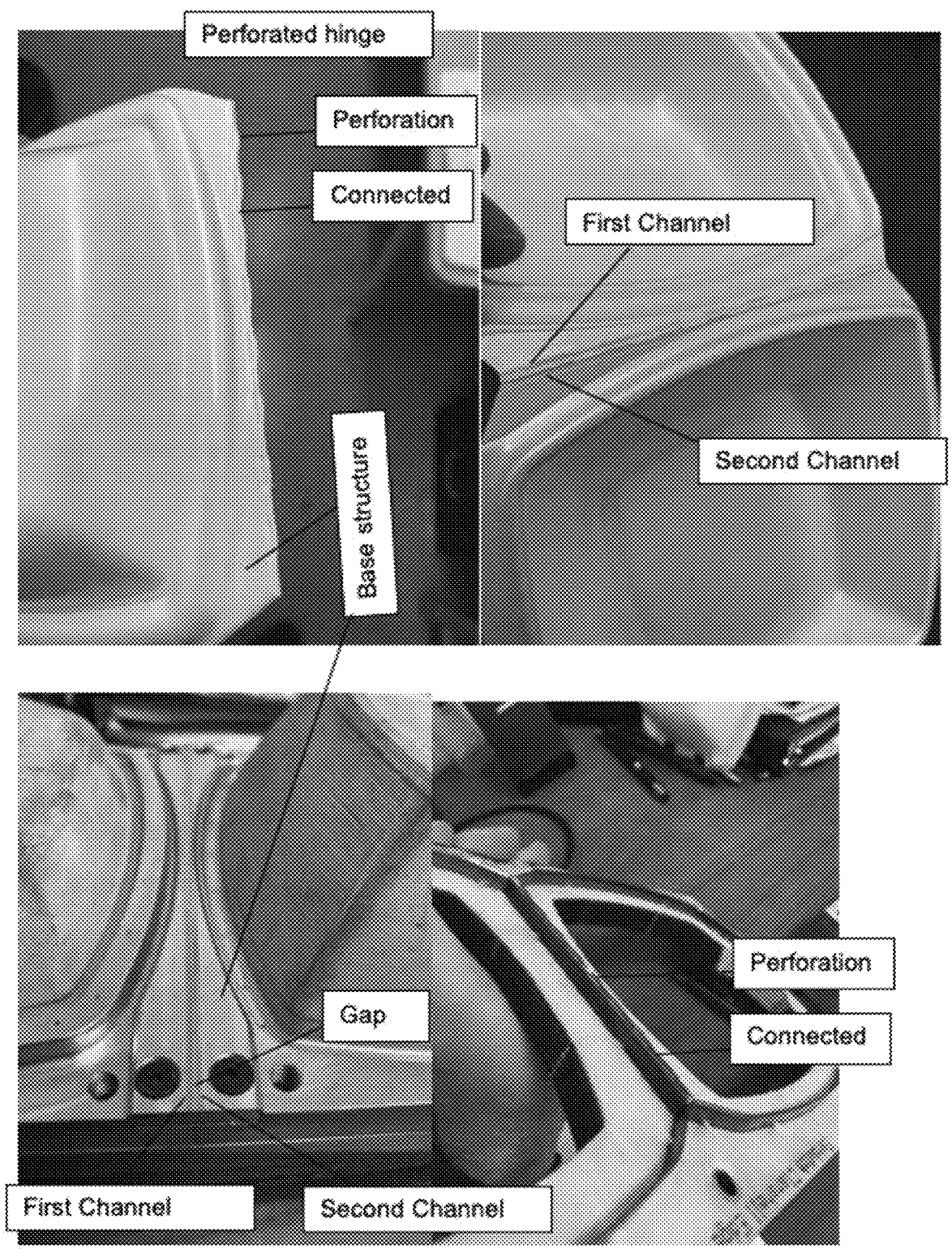
FIG. 7 shows pictures of a hinge element of a clamshell prepared according to methods disclosed herein.

Further compression and perforation may be performed during the trim stage of products, such as clamshells. An embodiment may include the hinge element described in the above with "outside" serrated perforations, formed by using a steel rule die along the opposite face ("outside") of the base structure profile where the hinge crease was created for the interior of the container. Perforations along this hinge point reduce restrictions that are potentially caused by exterior container surface tension that prevent ideal or complete closure. Such perforations may be generated by, e.g., a steel rule trim, with dual die lines, aligning with the back side (outside) of the hinge crease, both sharpened and non-sharpened segments, of 50% perforation at equal spacing of alternating 0.25" cuts, 0.25" non-cut/non-perforated lands of 0.040" metal/steel die. This allows sufficient tension to be relieved from the backside (outside) of the hinge during closure, and removes the propensity towards an open bias, while retaining physical material needed to maintain a unitary 1-piece article composed of top, hinge, and bottom, all created from a single "sheet. Perforated edges that do not cut do not go through and make holes. Instead, such non-cutting edges further compress the material to further increase the values of depth, e.g., values of parameters d1 and/or d2 depicted in FIG. 6B. FIG. 7 shows pictures of an example of a clamshell product and its hinge element as well as a metal mold and a trimmer that are used to form the clamshell product.

The surprising characteristics of a method of forming a hinge element as described herein is that the channel features are enabled by unique through-plane "crush" characteristics of the layered microstructure sheet (hinge base-structure material) and by non-recoverable compliance in the layered microstructure sheet. Inherently, such method is different from how solid plastics of comparable thickness form hinges, and how foamed plastic hinges need to be designed/formed. The method described herein enables hinge features to be formed in the mold without perforation and trimmed non-heated in the trim station of a thermoforming tool, making a critical component of a unitary clamshell production fast, and simple.

The crystallinity and microstructure combination obtained using the methods described in this invention provides the hinge toughness and strength, enabling repeatable opening and closing without catastrophic failure after few uses. By comparison, a dense PLA (or other sheet plastic) container without this microstructure is unable to form a hinge in this manner, as there are no voids for the material to collapse when cold-worked, and the material will not flow. A highly crystalline PLA article without this microstructure would have very brittle properties and would not be able to open and close without propensity to crack or fail. A PLA article without this microstructure and/or crystallinity (e.g., an existing uniform PLA foam) may be able to take a feature, but may not have non-recoverable compliance to retain the feature effectively, or may not have the strength/toughness resulting from layered microstructure to maintain the rigidity of the hinge and the article, therefore with potential to wrinkle or deform, thereby causing aesthetic or functional loss. In addition, the hinge created according to the method described in the above enables strong and aesthetically superior properties when hinge features are simultaneously perforated to enhance hinge performance.

Closure mechanisms, i.e., clasps, in products such as clamshells may include tabs and receiving slots into which tabs are inserted. Usually in the existing EPS foam clamshells and other PLA clamshells, an excessively elevated receiving slot for the tab to fit into is thermoformed during thermoforming the product so that the slot does not easily tear off, holds the lid closed, and can receive the foam/tab that is thick enough to be sufficiently strong and tear resistant. The rigidity and thinness of products enabled by the microstructure and crystallinity characteristics of the expanded sheet and the thermoformed product, e.g., a clamshell, prepared using the methods described herein, enables a novel and simpler clasp mechanism where the slot is directly cut, e.g., during trimming, into the clamshell lip/flange that receives the tab rather than thermoforming an excessively elevated reception for the tab. Both the slot and the tab are strong and tear resistant. The clamshell has the toughness to withstand a person bending the tab back to fit into the slot without breaking off. The slot is strong enough to be pulled down (and cantilever open) and fit the tab in without breaking off. It may be nearly impossible for the existing EPS or other PLA foams to make a functioning clasp (tab/slot) this way due to material thickness and low toughness/strength. In conventional foam tooling, tab holes are often cut by trimming in the mold with a spring-loaded die. This method was founded to leave bits of small-celled, high density skin layer near the trim feature. It was found that trimming using a knife-style die and bending the tab resulted in a clean cut.

The engagement of the clasp formed as described herein results in a distinct "snap" noise that appears to be specific to the multilayer microstructure, rigidity, and crystallinity of materials prepared according to the methods described herein, causing a specific resonance, thus perceptibly confirming the proper closure of the product for the user.

The relatively high toughness of the expanded materials described in this invention, while having high crystallinity and therefore thermal stability, may lead to a wide range of applications. A container with a crystallinity of at least 20%, and with a depth of at least 25 mm, may be formed by thermoforming and/or cutting and folding. This container can be filled with ice and dropped from a height of 1 meter without cracking.

The outer surface of the products prepared according to the methods described herein are smooth and very distinct from the existing open-cell structure in current EPS bead foams, and in existing PLA foams. The double-sided and vacuum molds that are typically used to remove residual blowing agents in these existing products do not leave a very smooth surface. This roughness results in poor print quality, poor shine, difficulty in writing, e.g., a pen can dig into the product unintentionally. Furthermore, bead foams also have visible dimples between the beads even after setting (interstitial spaces). The processes described herein expands and heats, enabling the surface to flow and expand uniformly, thereby offering one consistent flat surface with finer surface feature resolution, where all of the "bubbles" from the microcell layer create a smooth top surface/roof above the cell wall-scaffold below.

Figure 8:
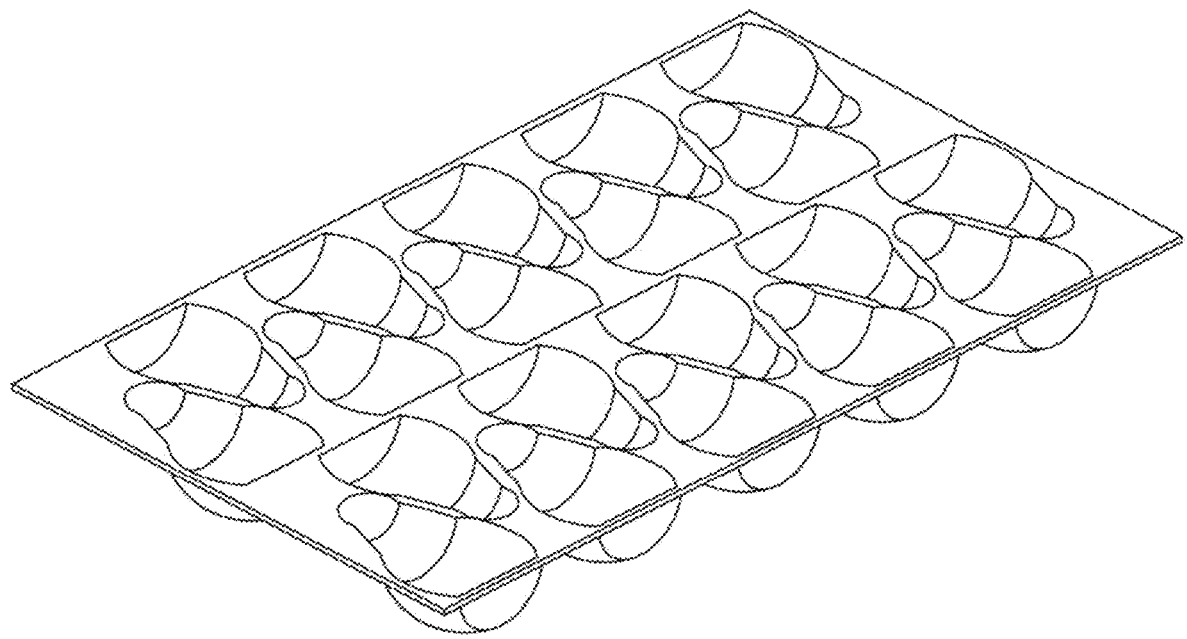
FIG. 8 is a schematic of a pear tray that can be prepared according to the methods disclosed herein.

FIG. 8 is a schematic of a pear tray that can be prepared according to the methods disclosed herein. A typical such pear tray with dimensions of about 15.5 inches by about 10.5 inches has pear wells with about 4 inches by about 3 inches and about 2 inches deep with wall thickness of the wells ranging from about 0.037 inches to about 0.060 inches, and weighing about 16.5 grams. Another thermoformed product with a thin wall and with a large draw ratio, but with unexpected strength, is a mushroom till. A typical mushroom till prepared using the methods herein with dimensions of about 6 inches by about 5.25 inches has mushroom wells of about 2 inches deep and with wall thickness ranging from about 0.040 inches to 0.065 inches and weighing at about 3.9 grams. The specific characteristics of closed microcell structure of materials prepared by the methods described herein may enable thinner and deeper (and hence lower-cost) products. Under the assumption of perfect material distribution, thinner and deeper products (i.e., with large draw ratio) require larger starting thickness. In the expanded material and its microstructures that is obtained by methods described herein, the majority of the volume is in the inner core which may be monolayer or bilayer. In the case of large draw ratios, the inner layer appears to sustain most of the deformation, which may lead to the deviation from the relationship between the draw ratio, starting thickness, and end-product wall thickness, since the material is not a uniform material. The walls of the inner layer appear thinner and more susceptible to deformation. Outer regions have more crystallinity than the inner regions. This suggests that the draw ratio may be increased and the wall thickness may be decreased beyond values that are predicted by the relationship that is valid for perfect material distribution. Even if a larger starting thickness were to be required for deep and thin products the material prepared according to the methods described herein would be lightest and most economical thanks to the microcellular structure and large expansion ratio. Typical foam trays or other existing PLA foam trays, for example, tend to have smaller draw ratios.

Another surprising advantage of products prepared according to embodiments of the methods described herein is the fact that products may become more heat stable with increasing draw ratios. Increasing draw ratios usually result in a decrease in thickness. Therefore, deep products such as meat trays and mushroom tills may simultaneously enjoy the benefits of heat stability (e.g., being able to transport empty products in non-refrigerated vehicles) and benefits of being thin and light and low density (e.g., fitting more empty products in same size or in lighter packages, and being less expensive using less material). The following table demonstrates this heat stability trend for an example embodiment of the methods described herein. The following table also shows the increase in heat stability with the increase in temperature of the material during thermoforming at the same form depth. Heat stability is expressed in terms of percentage change ("warp") in absolute value in one of the dimensions, e.g., depth, of the product at service temperatures at about 55° C. and about 60° C. The specified "form depth" of the product is directly correlated with the draw ratio. (Numerical values in Table 1 may be subject to small fluctuations and should be interpreted as being preceded by "about" as defined in the Definitions section in the below.)

TABLE 1

Heat stability versus forming depth and forming temperature.

| PLA Material | Form Depth (inches) | Form Temp (° C.) | Warp @55° C. (%) | Warp @60° C. (%) |
|---|---|---|---|---|
| Generic PLA | 1.0 | 113 | 2.99 | 7.46 |
| Generic PLA | 1.5 | 113 | 1.67 | 4.17 |
| Generic PLA | 1.5 | 118 | 0.00 | 0.85 |
| Generic PLA | 2.0 | 113 | 0.68 | 2.74 |

The expanded sheet prepared using the methods described herein can be rolled, as a side wall without cracking, enabling the treatment of the sheet like a paper, e.g., in making a cup similar to making a paper cup, laminated paper cup, or card-stock-style cup, which is faster, less energy intensive and simpler compared with EPS bead foam (vacuum formed) and, or deep-draw polypropylene cups.

Cups (or containers) formed from the expanded sheet prepared using the methods herein are much more insulating than paper counterparts due to the relatively huge amount of air trapped in the expanded sheet's microstructure (e.g., about 60% by volume or more). Such cups or containers can also be squeezed in in hand without side walls rupturing. In addition, the resilience of the material to take a bend without cracking or rupturing, thanks to the unique microstructure and crystallinity, enables progressively curling over the top edge, and forming a lip or a lip curl, i.e., lip rolling, just as with paper PMC style cup making. This is enabled by the unique ability to keep the material pliable by possibly using that airspace in the inner region cell layer to accommodate and compensate for compressive forces. In some embodiments, heating the material after or during a lip roll sets the lip in place without using chemical setting. In some embodiments, sonic welding may be used to fuse the wrapped cone of the expanded sheet prepared according to the methods described herein, without using adhesives. The expanded sheet prepared using the methods described herein is amenable to sonic welding. As the cells collapse and intimate contact is made between sheets (or a single sheet overlapping with itself), the sonic energy enables the polymers to rapidly knit together, forming a strong adhesive-free bond without applying heat. Similarly, the bottom of a cup (or a container) may be knurled and heat sealed, in some embodiments, by a circularly shaped expanded sheet. It is surprising that cups can be formed (without thermoforming) with striking similarity to the simplicity of forming paper cups, unlike most existing foamed and plastic cups.

Figure 9C:
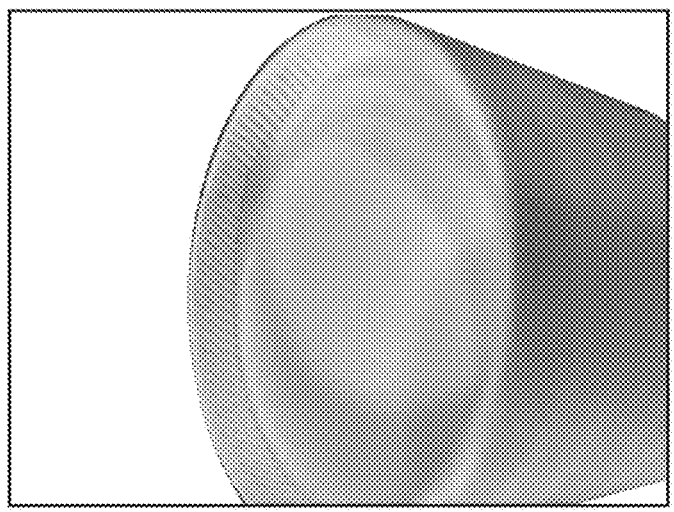
FIGS. 9A-9C show an example of sonic welded seam of a cup and the bottom of the cup prepared according to the methods disclosed herein.
Figure 9B:
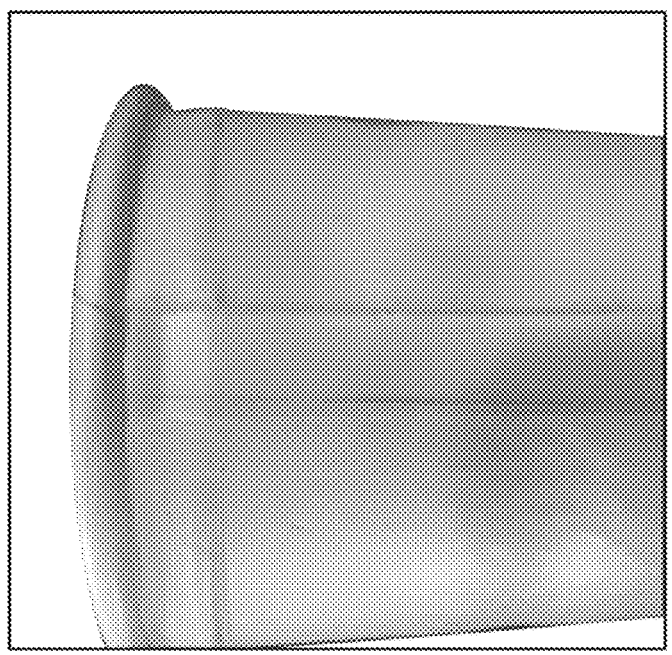
Figure 9A:
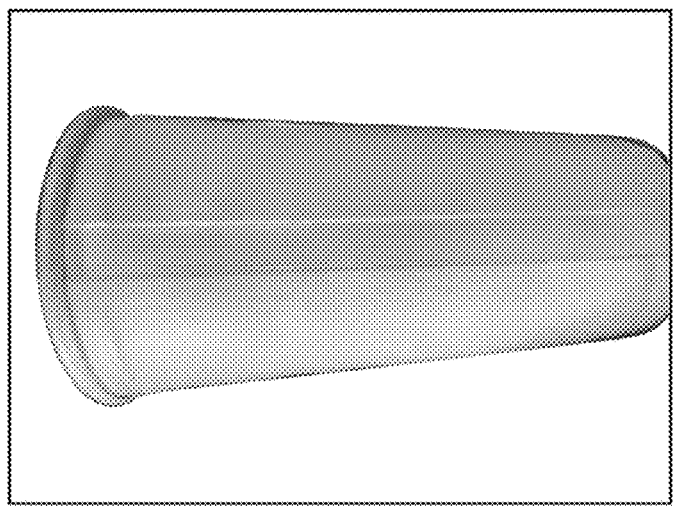

In some embodiments, insulated cups or containers formed according to the methods described herein may include a body having a sleeve-shaped side-wall, and a floor coupled to the body to cooperate with the side-wall, to form an interior region of a cup or a container for storing food, liquid or any suitable product. The cup body may include a rolled brim, coupled to the upper end of a side-wall, and a floor mount coupled to a lower end of a side-wall and to the floor. For example, the side-wall "body" blanks may be cut or stamped, providing aesthetically trimmed edges through crushing (collapsed cellular microstructure) as described in the above. The cup "sleeve" or "side-wall" base element may be formed by wrapping the cut blank around a mandrel or a cone (e.g., of approximately about 3.5" at one end and about 2.5" at the opposing end, in some embodiments) and subsequently forming a seam using e.g., a localized application of heat or sonic welding to form the continuous interior of the cup. The microstructure and crystallinity of the expanded sheet provide sufficient rigidity and toughness to minimize wrinkling, bunching, or creasing of the material, which may otherwise lead to mechanical or thermal defects/instabilities. The smooth sheet exterior (microcellular outer region), provides intimate contact of material and enables effective sonic weld formation with low distortion. Compression is enabled in the internal microstructure (providing sufficient hardness) to maintain contact during energy transfer from the sonic probe and enabling polymer to sufficiently interact with adjacent sheet surface and provide a sufficiently mechanically and thermally stable unitized sleeve element. FIGS. 9A and 9B show an example of a sonic welded seam obtain using the methods described here.

A die cut circularly shaped expanded sheet, or paper, or paper coated with PLA, may be inserted into the sleeve to form a bottom element. The combined side-wall and bottom elements may be transferred to a rotating mandrel, where mechanical folding may form an overlapping lip where the side-wall sheet encases the edge of the bottom element. A bottom seam may be formed through mechanical knurl, crimp, and/or heating mechanism to promote the side-wall sheet to encase the edges of the bottom element, as shown in FIG. 9C. Such mechanical force and/or heat, or sonic weld, forms a continuous leak preventing interior of a cup or a container. The unique expanded sheet microstructure's ability to respond to pressure and collapse uniformly and locally (i.e., edge crushing) in response, without excessive physical retraction in the presence of pressure or heat, thus enables the cup bottom to be formed rapidly and aesthetically in the case of a PLA foam similarly to a PLA coated paper cup.

Such structurally unitized cup or container elements may subsequently be processed to form a brim or lip feature. A unitized element may be rotated on a mandrel to gradually roll a lip/brim feature at the top edge of the sidewall. The initial curl may be formed while rotating the cup and applying an internal pressure to the top of the sidewall element to initiate a brim to "roll" over facing outwards. This initial mechanical stretch and curve forming is enabled in the expanded sheet due to the material toughness (due to unique microstructure and crystallinity) and favorable plastic-deformation and compliance properties of the material. The roll may be completed in a subsequent rotation stage, forming a smooth brim of e.g., approximately about ⅛" at the top of the sidewall, imparting functional rigidity, aesthetics, and smooth and comfortable contact with consumer during use. In some embodiments, during processing, heat or lubrication may be applied to the unitized element in order to facilitate the optimal amount of curl or radius. In some embodiments, subsequent contraction and mechanical fixation may be applied to maintain a permanent brim feature that is thermally stable during shipping, is amenable to storage of hot or cold material, or is amenable to mechanical mating with a lid element. In an embodiment, the expanded PLA sheet (either the sidewall element or the combined sidewall and bottom elements) may have a density in the range of about 0.025 g/cc to about 0.5 g/cc.

Figure 10B:
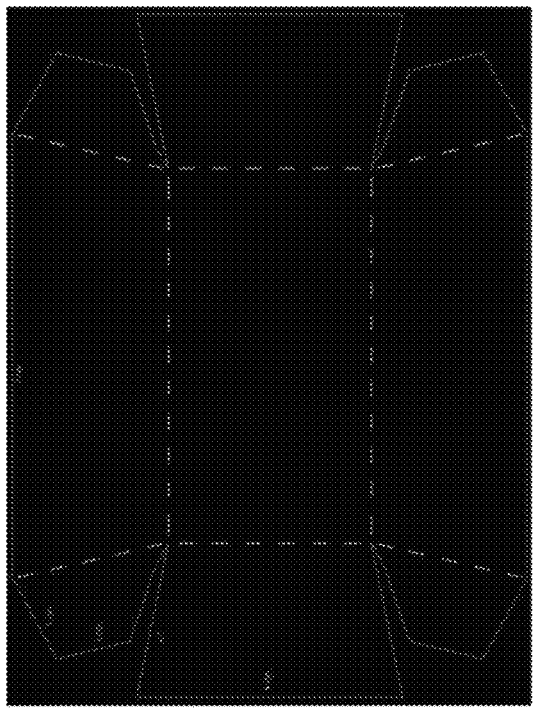
FIGS. 10A-D show an article of a unitary sheet that may be folded to make a 2-dimensional or a 3-dimensional container such as an envelope (2-dimensional), or a box, or a tray, or carton, etc. with a schematic view, schematic view with dimensions, auxiliary view, and top view.
Figure 10D:
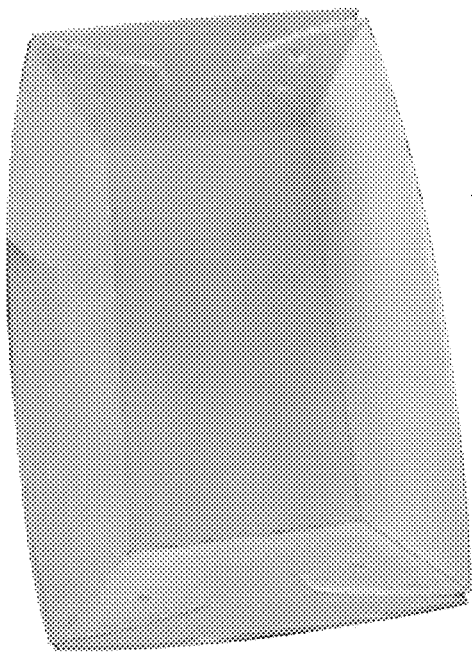
Figure 10A:
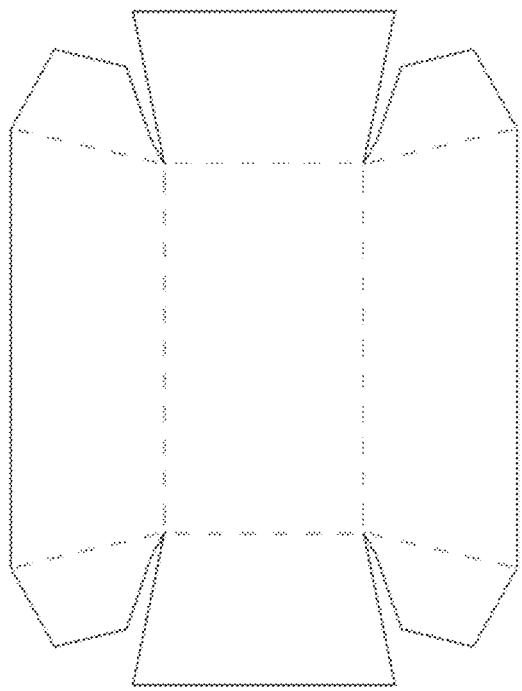
Figure 10C:
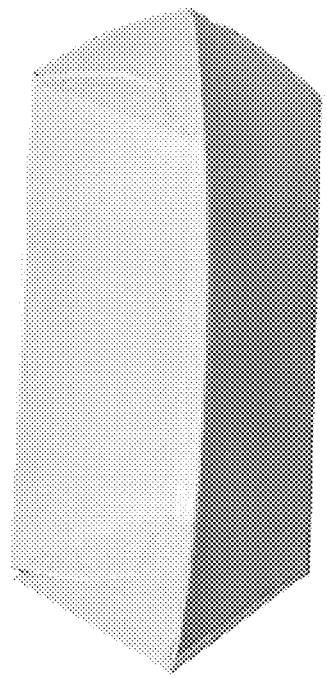

Yet another type of products that can be formed directly from the expanded sheet, prepared according to the methods described herein, and without thermoforming, are articles of a unitary sheet with creases and perforations that may be folded to form either a 2-dimensional or a 3-dimensional container such as an envelope (2-dimensional), box, tray, or a carton, for example. An expanded PLA sheet with a thickness ranging from about 0.045" to about 0.100" is placed above or below a steel rule die. Pressure is applied to the die for a period of time (typically under 2 seconds), and removed to provide a sheet that has strategically compacted (through edge crush) sections generating crease/fold points and cut sections for edges, hinges and/or flaps, and other container features. The crease/fold element is analogous to hinges as described in the above and may comprise of a compressed midsection during forming and/or trimming with or without perforations that creates a directed creasing point for hinging. When the structure is folded, forming a hinge, or a flap, the upper and lower surface fold toward each other to form a hinge of the container/article from a unitary structure. A preferred non-limiting embodiment is a steel rule die compacted onto from about 0.080" to about 0.085" gauge expanded PLA sheet to produce a pattern of crease features (dotted lines) and trim cuts (solid lines), as shown in FIGS. 10A and 10B, creating a 2-dimensional layout of hinges or flaps that direct folding elements of said flaps to overlap or meet, thus forming corners and generating a 3-dimensional article or a container when folded as shown in FIGS. 10C and 10D. In some embodiments, it may be fastened with sonic weld, or heat, or adhesive, or tabs/inserts, or with other suitable mechanisms.

Creases and the unique hinge/flap mechanisms enabled by localized crush characteristics provide desirable liquid containment without additional lamination. In some embodiments, laminations may be included, if desired, for modifying/improving permeability/impermeability characteristics for liquids or gases (e.g. water/vapor, $O_2$, $CO_2$, etc.).

Embodiments of 2-dimensional containers such as shipping envelopes, may utilize a more exaggerated fold on a crease line, e.g. above about 90 degrees and more like about 180 degrees fold. The insulating and impact resistant nature of the microstructure, and heat resistance lends itself as a unitized shipping container, potentially replacing foam or encapsulated air (e.g., BubbleWrap®) cushions within a paper or plastic envelope with a single material that acts as cushion and container simultaneously, and also provides exceptional print quality, and/or surface adhesion characteristics for label attachment. A crease may be formed at the edge, and sonic or heat welding may provide a unitized sealed enclosure, with a top crease/hinge at the unsealed end with flap/tab to enclose or seal the article for shipping by the end user. In effect, the need for plastic lining or coating on cardstock or paper may be eliminated thereby resulting in environmentally friendly shipping containers.

Products such as bags and pouches can be folded and sealed in a similar fashion to envelopes and boxes and cartons but preferably using relatively thinner and more flexible expanded sheet. Bags and pouches similarly retain the durability of folding and flexing, provided by the unique microstructure and the crystallinity, in addition to insulating characteristics. In some embodiments, products or articles described herein do not fracture when filled with ice and dropped from a height of 1 meter.

Container products made according to the methods described herein, such as meat trays and folded containers, may lend themselves to modified atmosphere packaging or encasing, for example by a seal formed at an opening of the container with a film or a membrane, such as a polymeric membrane and using heat or sonic or adhesive means in order to retain atmospheric conditions within the container, which may slow down or impact the deterioration of the product encased within.

Definitions

All definitions, as defined and used herein, should be understood to control over dictionary definitions, definitions in documents incorporated by reference, and/or ordinary meanings of the defined terms.

As used herein, "purifying" refers to the physical separation of a chemical substance of interest from foreign or contaminating substances. The terms "purifying", "modifying", and "adjusting" can be used interchangeably herein.

As used herein, "contacting" refers to the act of touching, making contact, or of immediate proximity.

As used herein, "ambient" refers to the conditions where the thermoplastic is being manufacture, e.g., the manufacturing floor. For example, in some embodiments, ambient refers to a temperature between 18° C. and 32° C. In some embodiments, ambient refers to a temperature of about 24° C. to about 28° C. and a relative humidity (RH) of about 25% to about 75%. In addition, all temperatures specified herein correspond to sea-level temperatures unless otherwise specified.

As used herein, "impregnating" refers to the act of infusing or saturating (partially or fully) a material with another substance, for example a gas. In some embodiments the infusing or saturating substance fills pores or spaces (e.g., cells) within a material. In some embodiments, the impregnating is reversible. In some embodiments, the impregnating is reversible under one condition or set of conditions, and irreversible under another condition or set of conditions. In some embodiments, the impregnating substance is a gas, including, but no limited to, carbon dioxide ($CO_2$) and/or nitrogen ($N_2$).

As used herein, "thermoplastic" refers to is a plastic polymer material that becomes pliable or moldable at a certain elevated temperature and solidifies upon cooling. Such materials are molten when heated and harden upon cooling. These characteristics, so the material can be reheated, reshaped, and frozen repeatedly. As a result, thermoplastics are mechanically recyclable. Examples of thermoplastics include, but are not limited to, polylactic acid, polypropylene, polyethylene, polyvinylchloride, polystyrene, polyethyleneterephthalate and polycarbonate.

As used herein, "bioplastic" refers to plastics derived wholly or in part from organic biomass (e.g., renewable resources such as cornstarch and sugarcane) rather than petroleum. In some embodiments, the bioplastic materials disclosed herein are biodegradable and compostable.

As used herein, "compostable plastic" or "compostable polymer" refers to those materials which are "capable of undergoing biological decomposition in a compost site as part of an available program, such that the plastic is not visually distinguishable and breaks down to carbon dioxide, water, inorganic compounds, and biomass, at a rate consistent with known compostable materials (e.g. cellulose), and leaves no toxic residue.

As used herein, "biodegradable polymer" refers to a polymer that will degrade under certain conditions. Example conditions include those prescribed by ASTM D6400, after being planted in soil for one year, or in the presence of certain solvents and/or enzymes.

As used herein, "thermoforming" refers to a process for forming three dimensional shapes from flat polymer sheets. In some embodiments, the process heat softens the flat polymer sheet and then vacuum or pressure forms the sheet onto a die with the required shape. In a non-limiting list of options, thermoforming produces general packaging as well as foam clamshells and solid plastic cups. As is understood by those of skill in the art, thermoforming in general refers to a set of related processes for producing shaped articles of thermoplastic. Included in thermoforming are the processes of vacuum forming, pressure assisted thermoforming, high definition thermoforming, drape forming, press forming and line bending.

As used herein, "deep draw" refers to the use of thermoforming to form a deep product with a draw ratio larger than one ("1") from a flat plastic or expanded plastic sheet. Draw ratio of a product is defined as the surface area of the product divided by the footprint of the product, assuming perfect material distribution. Non-limiting examples of deep products include coffee cups, some meat trays, and agricultural packaging, such as fruit trays (e.g., apple trays, pear trays, etc.), mushroom tills, and the like. As the draw ratio increases, or as any feature of the product becomes narrower than deep, the sheet becomes thinner.

As used herein, "thermostable" of "thermostability" refers to the quality of a substance to resist irreversible change in its chemical or physical structure at an elevated temperature. Throughout this application, the terms "thermostable" and "heat stable" may be used interchangeably without affecting the meaning of the disclosure. In various embodiments, a "heat stable" product is defined as a product that exhibits no visible warping (i.e., no more than a few %) when exposed to simulated container/truck ship testing (50-60° C.). Heat stability can also be assessed by ASTM D2126 (Standard Test Method for Response of Rigid Cellular Plastics to Thermal and Humid Aging).

As used herein, "microcellular plastics" refers to a foam fabricated to contain billions of tiny bubbles, also referred to as cells or micropores. In some embodiments, microcellular plastics are defined as having an average cell size on the order of 10 microns in diameter. In related embodiments, the typical range for the diameter of cells in a microcellular plastic is from about 0.1 microns to about 100 microns.

As used herein "deformation" refers to irreversible alteration(s) to the shape and/or size of a thermoplastic. Examples of deformation can include, but are not limited to warping, shrinking, bending and/or stretching of the thermoplastic.

The indefinite articles "a" and "an," as used herein in the specification and in the claims, unless clearly indicated to the contrary, should be understood to mean "at least one." Any ranges cited herein are inclusive.

As used herein, "multiple" refers to two or more, e.g., 2, 3, 4, or 5 or more.

The terms "substantially" and "about" used throughout this Specification are used to describe and account for small fluctuations. For example, they may refer to less than or equal to +5%, such as less than or equal to +2%, such as less than or equal to +1%, such as less than or equal to +0.5%, such as less than or equal to +0.2%, such as less than or equal to +0.1%, such as less than or equal to +0.05%.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also enables that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

EXAMPLES

Example 1

Continuous Process for Solid-State Expansion Polylactic Acid (PLA) Sheets:

PLA pellets are extruded into PLA sheet (0.005 inches to 0.100 inches) using a twin screw extruder (note: at this stage, the formed PLA rolls may optionally be stored for later use). The PLA sheet is unrolled and fed into a dynamic seal/slit/opening. After the dynamic seal, the sheet is saturated with $CO_2$ at 900 psi for about 2 min at 28° C. For desired gas absorption, the sample is pulled through the chamber at a rate and length to reach residence time of about 30 s to generate a PLA sheet that is impregnated with $CO_2$. Next, the sample is pulled through a second dynamic seal water controlled at a temperature of 28° C. to remove the sheet from high pressure $CO_2$. The sheet is immediately chilled until the temperature of the sheet is from about 5° C. to about 10° C. The sheet is then exposed to atmospheric conditions (about 20-40° C.) for about 10 seconds to about 30 seconds before subjecting the cooled PLA to steam or heat from about 40° C. to 75° C. (derived from a heating element or steam of about 91-98° C. water bath) for an additional 10-20 seconds. The PLA sheet is then advanced in a water bath at about 91° C. to about 98° C., which releases $CO_2$ and leads to expansion of the material.

Example 2

Process for Thermoforming Expanded PLA Sheets into Plates in a Small Green Sencorp Thermoforming Machine:

An expanded PLA sheet with a thickness ranging from 0.065-0.085 inches is fed onto chain-rails and heated under ceramic heaters to 350-450° F. for 6-8 seconds. The sheet is then advanced to zone 2 where it is heated under ceramic heaters to 200-300° F. and held for 6-8 seconds. In the next stage, the sheet is advanced to a non-heated or cooled male-female mold for a single or multi-cavity plate or food service item. The mold is closed to the desired gap (e.g., 0.035 inches gap for plates). The sheet is held under clamping force for 6-8 seconds. Pressurized air is applied to one side of mold for approximately 2-4 seconds. Optionally, vacuum can be applied to opposite side of mold simultaneously or overlapping duration with opposing air pressure on opposite side of product. The air pressure (and optional vacuum if applied) is discontinued and the mold is opened. For final processing, the product+web is advanced to a trimming station using steel rule die.

Example 3

Process for Thermoforming Expanded PLA Sheets into Plates in a Large Green Sencorp Thermoforming Machine:

An expanded PLA sheet with a thickness ranging from 0.065-0.085 inches is fed onto chain-rails and heated under ceramic heaters to 90-120° F. for 6-10 seconds. The sheet is then advanced to zone 2 where it is heated under ceramic heaters to 495-550° F. and held for 6-10 seconds. In the next stage, the sheet is advanced to a non-heated or cooled male-female mold for a single or multi-cavity plate or food service item. The mold is closed to the desired gap (e.g., 0.035 inch gap for plates). The sheet is held under clamping force for 6-10 seconds. Pressurized air is applied to one side of mold for approximately 2-6 seconds. Optionally, vacuum can be applied to opposite side of mold simultaneously or overlapping duration with opposing air pressure on opposite side of product. The air pressure (and optional vacuum if applied) is discontinued and the mold is opened. For final processing, the product+web is advanced to a trimming station using steel rule die.

Example 4

Examples of thermoformed products prepared by the disclosed methods with surprising physical properties and performance characteristics, and critical microcellular structure: PLA sheets that are prepared and expanded using the disclosed methods using different PLA grades and different expanded sheet thicknesses (or expanded gauges), e.g., "Thick" and "Thin" as denoted in the below, are used in thermoforming the example products described herein. Specifications of the expanded sheets for different PLA grades are included in Table 2 in the below. (Numerical values in Table 2 and in all the tables in this section may be subject to small fluctuations and should be interpreted as being preceded by the term "about" as defined in the Definitions section in the above.) The inventors confirmed through a large number of experiments and trials that the desirable physical properties and performance characteristics of these example products of particular dimensions can be achieved with a wide range of other different product dimensions.

TABLE 2

Example Expanded PLA Sheets: Characteristics

| Feature | Generic PLA Thick | Generic PLA Thin | low-D PLA |
|---|---|---|---|
| Initial width (inch) | 8 | 8 | 8 |
| Initial gauge (0.001" or thou) | 18 | 18 | 18 |
| Expanded width (inch) | 16 | 16 | 12 |
| Expanded Gauge (Sheet Thickness) (0.001") | 100 | 65-75 | 75-88 |
| Grams/inch^2 (gsi) | 0.09 | 0.08 | 0.16 |
| Durometer (Shore A) | Fails: 9-11 | Fails: 33, other: 60 | 70-75 (33 if fail, rarely) |
| Pores (count/in^2) | None | None | 40,000 |
| Outer layer cell aspect ratio (L:W) | 1:1 | 1:1 | 1:1 |
| Outer layer cell diameter (microns) | 20-50 | 11-20 | 11-16 and 80-150 |
| Outer layer thickness (mm) | 0.22 | 0.26 | 0.08 and 0.1-0.2 |
| Inner layer cell aspect ratio (L:W) | 6:1 | 7:1 | 7.5:1 |
| Inner layer cell length (mm) | 0.91-1.0 | 0.85 | 1.5 |
| Inner layer cell width (mm) | 0.15-0.19 | 0.12-0.15 | 0.18-0.3 |
| Inner layer thickness (mm) | 1.9 (2 cells) | 1.7 (2 cells) | 1.5 (1 cell) 2 (w/transition layer) |
| Crystallinity (%) | 44.6% | 36% | 57.4% |

FIGS. 11A, 11B, 12A, 12B, 13A and 13B show optical microscope cross-section images (at about 4 times magnification), sectioned for in-plane imaging, of an expanded low-D PLA, Generic PLA Thick and Generic PLA Thin sheets, respectively, as specified in Table 2.

Meat Trays:

Characteristics and specifications of an example set of meat trays using different PLA grades are included in Table 3 in the below. These meat trays are surprisingly heat stable, and surprisingly light, up to about 50% lighter than a comparable EPS product. In addition, a typical EPS meat tray will require a thickness of about 300 thou, e.g., about at least 3 times thicker than the thickest product specified in Table 3, in order to provide the comparable and required rigidity. Such typical EPS tray is about 0.19 grams per square inches, up to more than about 2 times of that of the products specified in Table 3 in the below.

TABLE 3

Example Meat Trays

| Feature | Generic PLA Thick | Generic PLA Thin | low-D PLA |
|---|---|---|---|
| Product Dimensions (in * in) | | 7.25 × 4.25 | |
| Product Depth (in) | | 0.630 | |
| Sheet Thickness (0.001") | 100 | 65-75 | 75-88 |
| Prod Thickness (0.001") | 80 | 50-70 | 90 (25-98) |
| Weight (grams) | 2.9 | 2.65 | 4.8 |
| Grams/inch^2 (gsi) | 0.09 | 0.08 | 0.16 |
| Heat Resistance (<10% warp at ° C.) | 55-60 | 55-60 | 65-75 |
| 3pt bend (max load in lbs.) | 3.3 | 1.6 | 2.75 |
| Durometer (Shore A) | 55-60 | 50-60 | 65-78 |
| Pores (count/in^2) | None | None | 40,000 |
| Outer layer cell aspect ratio (L:W) | 1:1 | 1:1 | 1:1 |
| Outer layer cell diameter (microns) | 20-30 | 10-20 | 6-8 |
| Outer layer thickness (mm) | 0.11-0.22 | 0.25 | 0.07-0.1 |
| Inner layer cell aspect ratio (L:W) | 4-5:1 | 4.5:1 | 4-6.5:1 |
| Inner layer cell length (mm) | 0.8 | 0.49 | 1-1.18 |
| Inner layer cell width (mm) | 0.18-0.2 | 0.11 | 0.18-0.29 |
| Inner layer thickness (mm) | 1.63 | 1.03 | 1.2 |
| Crystallinity (%) | 39.5 | 34 | 54.8 |

In contrast to these example meat trays in Table 3, an existing 14.75×8.0"×0.83" (length×width×depth) Novipax PLA meat tray that is commercially available at present has the following thickness, heat resistance, and durability specifications:

Thickness: 0.200" (about at least twice as thick as the meat tray prepared according to the methods described herein);

Heat resistance: about 32% warp in original depth (about at least more than 3 times more warping than the meat trays prepared according to the methods described herein), i.e., shrinkage to about 68% of original depth at about 55° C., and about 59% warp in original depth (about at least 6 times more warping than the meat trays prepared according to the methods described herein), i.e., shrinkage to about 41% of original depth. From Table 3, the meat tray produced according to the methods described herein maintain more than about 90% of their original dimension in the range of temperatures from about 55° C. to about 65° C.

Durometer: 40-50 Shore A rating, lower than the meat trays prepared according to the methods described herein as shown in Table 3.

In addition, the Novipax tray has the following microstructure characteristics:

Cell aspect ratio: about 1:1;

Cell diameter: about 0.39 mm (about 15 thou);

Crystallinity (%): about 13% (much lower than that of the examples in Table 3).

There are a number of form factors for the sale of meat that do not require thermoforming that can benefit from grease-resistant, lightweight and strong materials. One example of this would be a flat or creased/folded board which serves as a component in a system for packaging meat. One example of this would be a low-density thermoplastic sheet with a specific weight below 0.12 grams/in² which could be used either flat or with crease. A barrier layer could be added to this through silicon-oxide coatings, metallization, or thermoplastic films. Meat could then be placed on this board, and an additional layer laminated to it that could also include barrier properties. Alternatively, the meat and board could be placed inside a structure made from two sheets or a bag.

Figure 12A:
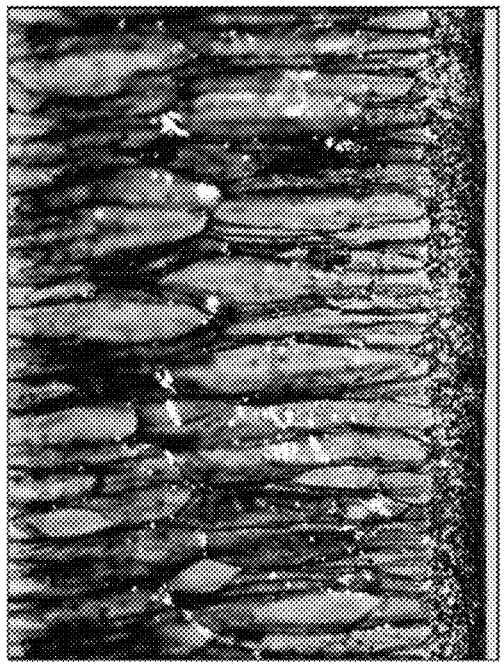
FIGS. 12A-D show optical microscope cross-section images, sectioned for in-plane imaging, of an expanded thick sheet prepared according to the methods described herein from a Typical thermoforming grade PLA, and cross section images of a sidewall of sample thermoformed products obtained using the thermoforming methods described herein with a top view, bottom view, shallow product view, and deep product view, respectively.
Figure 12B:
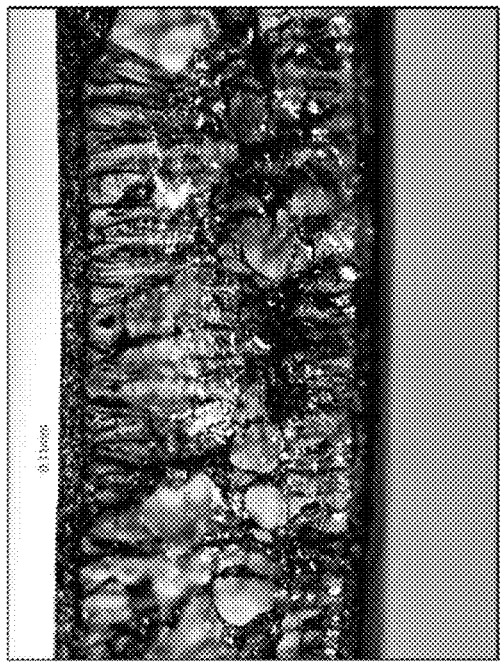
Figure 12C:
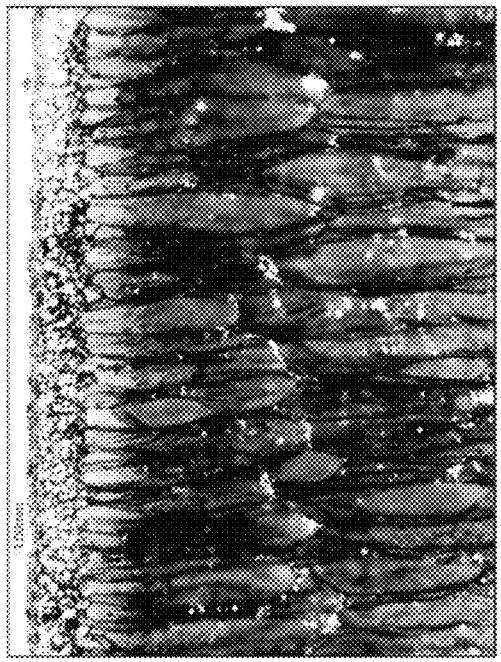
Figure 13A:
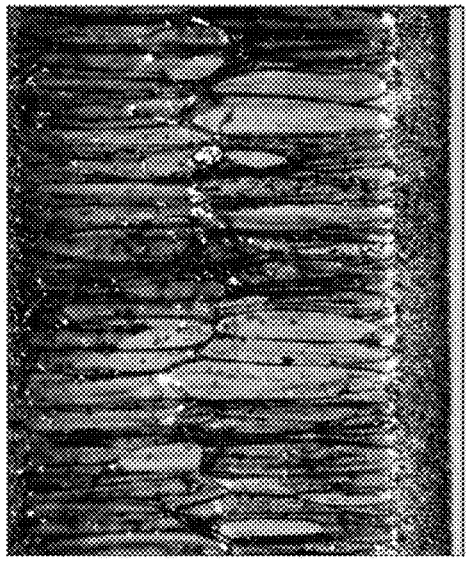
FIGS. 13A-D show optical microscope cross-section images, sectioned for in-plane imaging, of an expanded thin sheet prepared according to the methods described herein from a Generic PLA, and cross section images of a sidewall of sample thermoformed products obtained using the thermoforming methods described herein with a top view, bottom view, shallow product view, and deep product view, respectively.
Figure 13B:
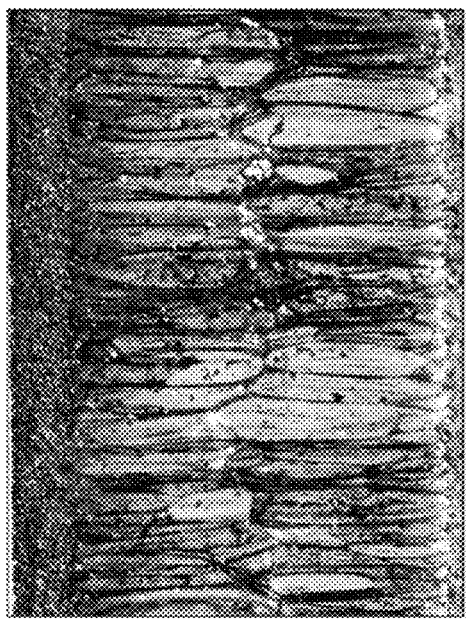
Figure 13C:
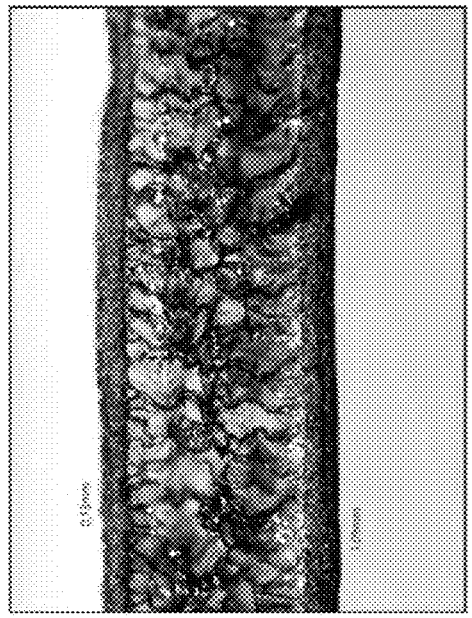

FIG. 11C, FIG. 12C, and FIG. 13C show optical microscope cross-section images (at about 4 times magnification) of a sidewall of thermoformed shallow products such as meat trays that are specified in Table 3 for low-D PLA, Generic PLA Thick, and Generic PLA Thin sheets, respectively.

In post-thermoformed microstructures shown in FIG. 11C, FIG. 12C, and FIG. 13C, there may be a subtle collapse of microstructure near both surfaces and an identifiable buckling in elongated cell wall structure, as a result of heat and force that are applied to form a shaped surface from the expanded PLA sheet during thermoforming. The draw ratio for these products is relatively small and thus the general shape of elongated cells remains identifiable, albeit with altered width, length, and layer thicknesses as reflected in Table 3.

Clamshells and Foodservice Products:

Characteristics and specifications of a set of example hot-food service products, i.e., clamshells are included in Tables 4 and 5 in the below for different PLA materials. These clamshells are surprisingly heat stable, the low-D PLA grade heatset clamshells are heat set at about 130° C. If/when required, they can be made slightly thicker using material less than that would usually be required, thanks to the methods disclosed herein.

TABLE 4

Example Clamshells-Size 1

| Feature | Generic PLA Thick | Generic PLA Thin | low-D PLA | low-D PLA (Heatset) |
|---|---|---|---|---|
| Product Dimensions (in * in) | 6 × 6 (lid only) | | | |
| Product Depth (in) (half-shell) | 1.56 (highest, lid only) | | | |
| Sheet Thickness (0.001") | 100 | 65-75 | 75-88 | 75-88 |
| Prod Thickness (0.001") | 40-70 | 35-50 | 40-70 | 40-73 |
| Weight (grams) | 6.2 | 5.75 | 9.6-9.9 | 9.6-9.9 |
| Grams/inch^2 (gsi) | 0.09 | 0.08 | 0.16 | 0.16 |
| Heat Resistance (<10% warp at ° C.) | 55-60 | 55-60 | 70 | 105 |
| Top Load (max load in lbs.) | 3.0 | 3.2 | 4.7 | 7.3 |
| Durometer (Shore A) | 26-48 | 35-60 | 55-70 | 58-72 |
| Pores (count/in^2) | None | None | 40,000 | 40,000 |
| Outer layer cell aspect ratio (L:W) | 1:1 | 1:1 | 1:1 | 1:1 |
| Outer layer cell diameter (microns) | 8-15 | 10-29 | 40-110 (only transition layer) | 5-10 & 80-120 |
| Outer layer thickness (mm) | 0.11 | 0.13 | 0.15-0.18 | 0.03-4 & 0.09 |
| Inner layer cell aspect ratio (L:W) | 1.5:1 | 2-3:1 | 6.5-7:1 | 7-10:1 |
| Inner layer cell length (mm) | 0.55 | 0.40 | 1.0 | 1.11 |
| Inner layer cell width (mm) | 0.10-0.30 | 0.15-0.30 | 0.15-0.2 | 0.09-0.15 |
| Inner layer thickness (mm) | 1.11 | 0.83 (2 cells) | 1.0 | 1.11 |
| Crystallinity (%) | 43% | 39% | 51.3% | 65.2% |

Characteristics and specifications of another example of clamshells with a different dimension (Size 2), prepared using the methods described herein, are included in Table 5 in the below.

TABLE 5

Example Clamshells-Size 2

| Feature | Generic PLA Thick | low-D PLA | low-D PLA (Heatset) |
|---|---|---|---|
| Product Dimensions (in * in) | 8 × 8.5 closed (17 × 8 open) | | |
| Depth (in) (half-shell) | 1.65 (highest, lid only), 1.80 bottom | | |
| Sheet Thickness (0.001") | 100 | 75-88 | 75-88 |
| Prod Thickness (0.001") | 59-95 | 40-70 | 40-60 |
| Weight (grams) | 16.5 | 22.5 | 22.5 |
| Grams/inch^2 (gsi) | 0.12 | 0.165 | 0.165 |
| Heat Resistance (<10% warp at ° C.) | 55-60 | 70 | 105 |
| Top Load (max load in lbs.) | 7.5 (4.7 corners) | 6.0 (5.7 corners) | 7.2 (5.5 corners) |
| Durometer (Shore A) | 26-48 | 55-70 | 58-72 |
| Pores (count/in^2) | None | 40,000 | 40,000 |
| Outer layer cell aspect ratio (L:W) | 1:1 | 1:1 | 1:1 |
| Outer layer cell diameter (microns) | 8-15 | 40-110 (only transition layer) | 5-10 & 80-120 |
| Outer layer thickness (mm) | 0.11 | 0.15-0.18 | 0.03-4 & 0.09 |
| Inner layer cell aspect ratio (L:W) | 1.5:1 | 6.5-7:1 | 7-10:1 |
| Inner layer cell length (mm) | 0.55 | 1.0 | 1.11 |
| Inner layer cell width (mm) | 0.10-0.30 | 0.15-0.20 | 0.09-0.15 |
| Inner layer thickness (mm) | 1.11 | 1.0 | 1.11 |
| Crystallinity (%) | 43% | 51.3% | 65.2% |

The shape and physical features of an example clamshell similar to those described in Tables 4 and 5 are shown, as viewed from a multitude of different perspectives, in FIG. 14. The clamshell shown in FIG. 14 includes hinge elements and clasp mechanisms that are prepared according to the respective descriptions in the previous subsection titled "Products".

Figure 12D:
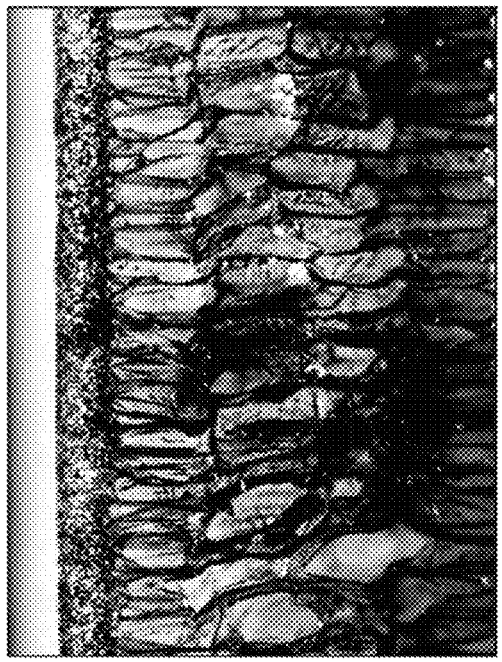
Figure 13D:
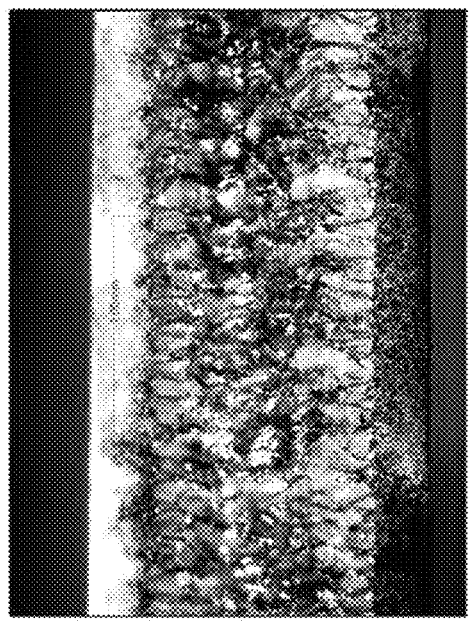
Figure 14A:
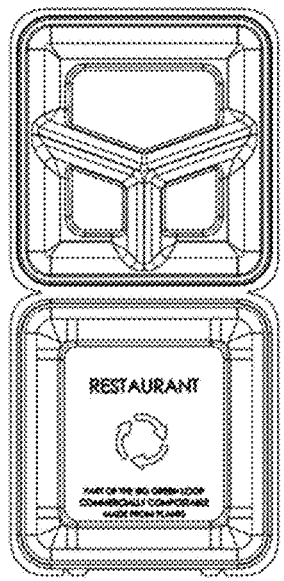
FIGS. 14A-F show drawings of clamshells and clamshells from different viewing perspectives, which are prepared according to the methods disclosed herein with a top view exterior, auxiliary view exterior, auxiliary view interior, side view exterior, another auxiliary view interior, and auxiliary view exterior when closed, respectively.
Figure 14B:
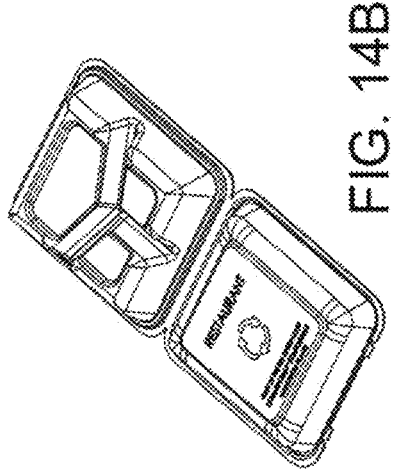
Figure 14C:
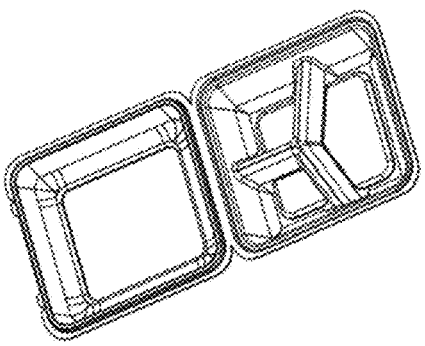
Figure 14D:
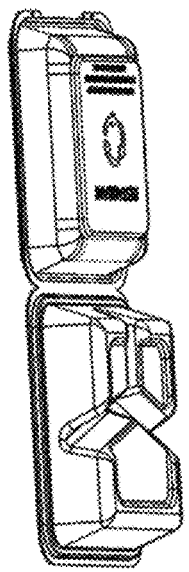
Figure 14E:
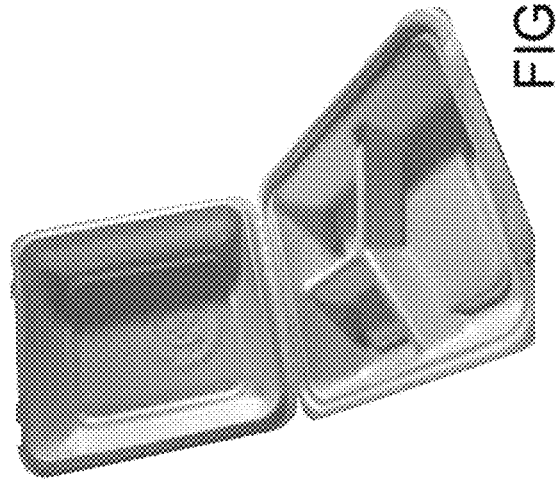
Figure 14F:

FIG. 11D, FIG. 12D, and FIG. 13D show optical microscope cross-section images (at about 4 times magnification) of a sidewall of thermoformed deep products such as clamshells that are specified in Table 4 for low-D PLA, Generic PLA Thick, and Generic PLA Thin sheets, respectively. FIG. 11E shows an optical microscope cross-section image (at about 4 times magnification) of a sidewall of a thermoformed (with heatsetting as described in the above) deep product such as a clamshell specified in Table 4 for a low-D PLA sheet: "low-D PLA (Heatset)".

In FIG. 11D, FIG. 12D, and FIG. 13D, the corresponding depth of the product is about 1.5" and the overall gauge (surface to surface distance or thickness) is noticeably reduced relative to the starting expanded sheet, or relative to shallow products. Forming forces (and/or shear mechanism) during thermoforming may distort elongated cells in the inner region, as can also be seen from the respective specifications in Tables 2 and 4. In addition, elongated cells in the inner region may have sufficiently thin walls possibly resulting in openings between neighboring cells, but limited to within a few cells and within the inner region, and without causing catastrophic rupture across the product thus retaining inherent material property advantages imparted by the microstructure and crystallinity imbued during the expansion process. FIG. 13E shows a heatset version of the microstructure.

A Plate or a Shallow Tray:

Characteristics and specifications of an example plate (or a shallow tray) are included in Table 6 below. This plate is surprisingly light at about 12 grams and it is thin but still meeting the commercial requirements such as resistance to cutlery (Durometer Shore A values at about 80 to about 85), and heat resistance requirements.

TABLE 6

Plate/Tray

| Feature | low-D PLA |
|---|---|
| Product Dimensions (in * in) | 10 × 8.25 |
| Product Depth (in) | 0.5 |
| Sheet Thickness (0.001") | 65 |
| Prod Thickness (0.001") | 55-62 |
| Weight (grams) | 12 g |
| Grams/inch^2 (gsi) | 0.145 |
| Heat Resistance (<10% warp at ° C.) | 70 |
| Durometer (Shore A) | 80-85 |
| Pores (count/in^2) | 40,000 |
| Outer layer cell aspect ratio (L:W) | 1:1 and 3:1 (transition layer) |
| Outer layer cell diameter (microns) | 11-16 and 50-150 |
| Outer layer thickness (mm) | 0.07-0.14 and 150 |
| Inner layer cell aspect ratio (L:W) | 8-12:1 |
| Inner layer cell length (mm) | 1.2 (squished) |
| Inner layer cell width (mm) | 0.08-0.19 |
| Inner layer thickness (mm) | 1.34 |
| Crystallinity (%) | 43.4% |

It may also be possible to cut and fold the material in equipment typically used for paper-folding operations. The material weights above can be used as rough starting numbers.

Figure 15A:
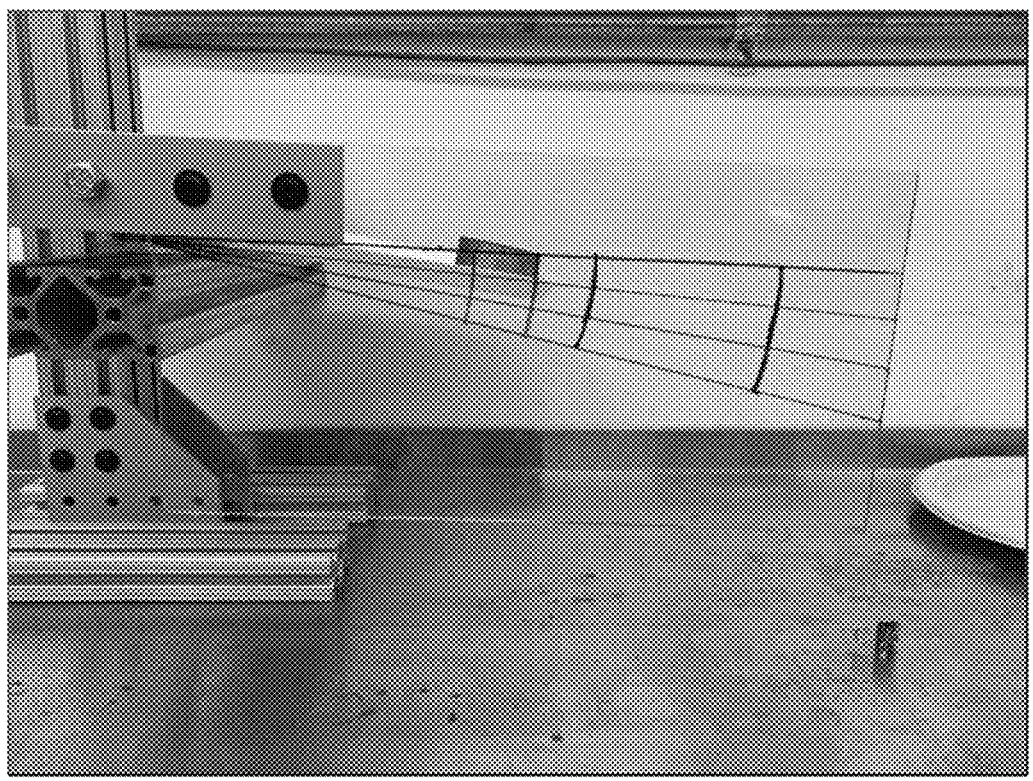
FIGS. 15A and 15B show cantilever test scenarios for plates with a plate prepared according to the methods disclosed herein and an existing commercially available paper plate product, respectively.
Figure 15B:
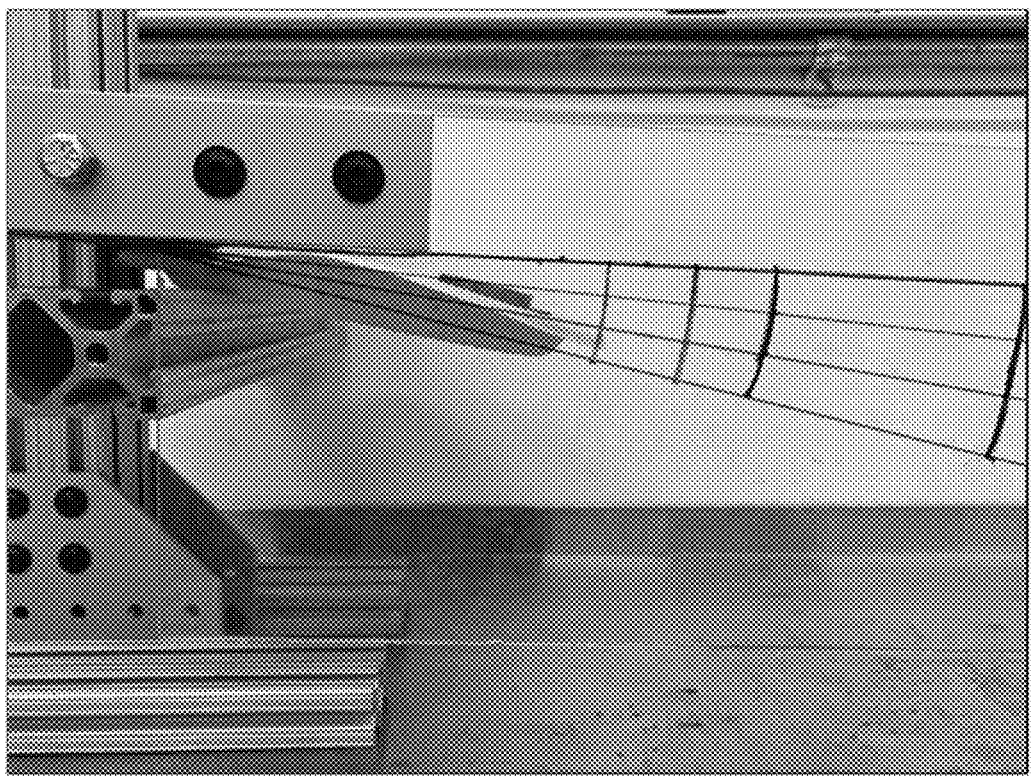

A cantilever test can be conducted to assess the strength of a plate product. The cantilever test is designed to assess the strength of the plate under static load while the user is holding the plate, e.g., an amount of food while the plate is being held with one hand. An example cantilever test scenario is shown in the picture in FIGS. 15A and 15B, where FIG. 15A shows the scenario with a plate prepared using the methods described herein, e.g., that specified in Table 6, and FIG. 15B shows the scenario with an existing commercially available paper plate product under the exact same static load, where the angle of deflection is also shown relative to a transparent template with a grid of angular lines drawn on it to facilitate an assessment of angular deflection. For example, a same specific amount of deflection is reached by 0.96 lbs. versus 1.0 lbs. load in the case of a plate prepared according to the methods described herein versus an existing commercial paper plate product shown in FIGS. 15A and 15B, where the loads were applied at about the same distance from the grip point. It should be noted that the two plates are no identical and may have differences in their lips and in their width.

Cups:

Tables 7 and 8 include some of the physical properties and performance characteristics of examples of cups prepared, without the step of thermoforming, according to the methods described herein, especially in the subsection "Products" in the above, e.g., using the methods of lip rolling for forming the lip, and forming the seam and the bottom elements of a cup, and from the expanded low-D PLA with characteristics specified in Table 2 in the above. It is remarkable that these cups can be formed (without thermoforming) with striking similarity to the simplicity of forming paper cups unlike most existing foamed and plastic cups.

TABLE 7

Cup-1

| Feature | low-D PLA |
|---|---|
| Product Dimensions (in) | Top diameter: 3.55 and bottom diameter: 2.45 |
| Depth/Height (in) | 6.2 |
| Sheet Thickness (0.001") | 40-45 |
| Prod Thickness (0.001") | 40-45 (not thermoformed: matches the sheet) |
| Weight (grams) | 11.94 |
| Grams/inch^2 (gsi) | 0.16 (not thermoformed matches the sheet) |
| Heat Resistance (<10% warp at ° C.) | 70 or higher |

TABLE 8

Cup-2

| Feature | low-D PLA |
|---|---|
| Product Dimensions (in) | Top diameter: 3.5 and bottom diameter: 2.5 |
| Depth/Height (in) | 4.65 |
| Sheet Thickness (0.001") | 82-90 |
| Prod Thickness (0.001") | 40-45 (not thermoformed: matches the sheet) |
| Weight (grams) | 8.80 |
| Grams/inch^2 (gsi) | 0.16 (not thermoformed: matches the sheet) |
| Heat Resistance (<10% warp at ° C.) | 70 or higher |

Boards:

Another type of products that may be produced using the expanded sheets prepared by the methods described herein are flat layered-micro-structured boards that may be used as advertising, poster, or notice boards with paper laminated on one the sides, or as office dividers, pegboards, cowling and decorative tiles, or as lightweight cores and components for other assembled products and composites.

In some embodiments, a board may be 0.12 inches thick, and it may be manufactured by cutting the expanded sheets into boards without winding.

Folded Two-Dimensional or Three-Dimensional Containers:

Yet another type of products that can be formed directly from the expanded sheet, prepared according to the methods described herein, and without thermoforming, are articles of a unitary sheet with creases and perforations that may be folded to form either a 2-dimensional or a 3-dimensional container such as an envelope (2-dimensional), box, tray, or a carton, for example, as described in the subsection "Products" in the above. The expanded sheet used in the particular example product shown in FIG. 10(C) shares the same specifications with the "Generic PLA Thick" as shown in Table 2 except being of an expanded gauge of about 0.080" to about 0.085".

The number and configuration of crease points and segments, dimensions, flap and fold designs, may vary with specific product designs, e.g., designs providing more liquid holding characteristics such as milk cartons, and/or with varying thickness of the base PLA material.

A key element of this layout versus a thermoformed product is the fact that it offers enhanced heat stability as the sheet flatness retains the original microstructure without a "draw" mechanism when forming. Therefore, little or no undue residual stresses are present when heat is applied during use. This property enables the use of lower density, lower grade PLA (2003) thereby achieving improved heat resistance using a cheaper PLA feedstock material. In some embodiments, products are extremely heat stable with up to about 2% warping at about 70° C. temperatures.

In addition, the natural flat state of the sheet prior to die cutting enables direct high-fidelity printing of markers and patterns on the surfaces. Features such as locking lids, handles, and other elements that may be commonly found in containers made of craft paper, paperboard, or cardstock, may be included in such folded container products.

One of the limitations of many compostable films which reduce the transmission of oxygen and/or water vapor through a film is that their performance degrades when folded or creased. The relatively high rigidity of the materials produced in this invention can serve as a reinforcement or scaffold to support their relatively fragile materials. Specific embodiments of containers that would take advantage of these properties would be boxes or cartons for shelf-stable foodservice products (including meats). Multi-layer films including cellophane have been shown to be useful in cover films for meat trays, and so a tray of a formed or folded carton combined with a cellophane film could enable a compostable, shelf stable package for meats.

What is claimed is:

1. An expanded thermoplastic sheet, comprising:
   a first outer region, a second outer region, and an inner region disposed between the first outer region and the second outer region,
   the first outer region having a first thickness and the second outer region having a second thickness, the first outer region and the second outer region including cells having a first average dimension;
   the inner region having a third thickness between about 1 mm and about 2 mm, the third thickness greater than the first thickness and the second thickness, the inner region including cells having a second average dimension; and
   the expanded thermoplastic sheet having a crystallinity between about 25% and about 75%.

2. The expanded thermoplastic sheet of claim 1, wherein the first outer region and the second outer region have a percent crystallinity that is greater than a percent crystallinity of the inner region.

3. The expanded thermoplastic sheet of claim 1, having a specific weight of less than about 0.5 g/in³.

4. The expanded thermoplastic sheet of claim 1, having a density of about 0.05 g/cc to about 0.25 g/cc.

5. The expanded thermoplastic sheet of claim 1, having a flexural strength of about 0.2 MPa to about 80 MPa according to the ASTM C78 test.

6. The expanded thermoplastic sheet of claim 1, having a tensile strength of about 0.2 MPa to about 50 MPa according to the ASTM C78 test.

7. The expanded thermoplastic sheet of claim 1, having a shear strength of about 0.2 MPa to about 40 MPa according to the ASTM C78 test.

8. The expanded thermoplastic sheet of claim 1, wherein the cells of the first outer region and second outer region have an aspect ratio of about 1:1.

9. The expanded thermoplastic sheet of claim 1, wherein the cells of the first outer region and second outer region have a dimension of from about 25 µm to about 75 µm.

10. The expanded thermoplastic sheet of claim 1, wherein the cells of the inner region have a length to width aspect ratio of greater than about 1:1.

11. The expanded thermoplastic sheet of claim 10, wherein the cells of the inner region are elongated.

12. The expanded thermoplastic sheet of claim 10, wherein the cells of the inner region have a length to width aspect ratio of at least about 4:1.

13. The expanded thermoplastic sheet of claim 1, wherein the cells of the inner region have a length to width dimension of from about 200 µm to about 800 µm by about 50 µm to about 200 µm.

14. The expanded thermoplastic sheet of claim 1, further comprising an outside surface.

15. The expanded thermoplastic sheet of claim 1, further comprising a transition region between the first outer region and the inner region.

16. The expanded thermoplastic sheet of claim 1, wherein the expanded thermoplastic sheet is folded to form a 2-dimensional and/or a 3-dimensional container.

17. The expanded thermoplastic sheet of claim 1, wherein the expanded thermoplastic sheet has a form depth between 1 and 2 inches and a warp at 60° C. of between 0.85% and 7.46%.

18. An expanded thermoplastic sheet, comprising:
    a first outer region, a second outer region, and an inner region disposed between the first outer region and the second outer region,
    the first outer region having a first thickness and the second outer region having a second thickness, the first outer region and the second outer region including cells having a first average dimension,
    the inner region having a third thickness between about 1 mm and about 2 mm, the third thickness greater than the first thickness and the second thickness, the inner region including cells having a second average dimension; and
    the expanded thermoplastic sheet having a flexural strength of about 0.2 MPa to about 80 MPa according to the ASTM C78 test.

19. The expanded thermoplastic sheet of claim 18, wherein the expanded thermoplastic sheet has a crystallinity between about 25% and about 75%.

20. The expanded thermoplastic sheet of claim 18, wherein the expanded thermoplastic sheet has a specific weight of less than about 0.5 g/in³.

21. The expanded thermoplastic sheet of claim 18, wherein the expanded thermoplastic sheet has a density of about 0.05 g/cc to about 0.25 g/cc.

22. The expanded thermoplastic sheet of claim 18, wherein the expanded thermoplastic sheet has a tensile strength of about 0.2 MPa to about 50 MPa according to the ASTM C78 test.

23. The expanded thermoplastic sheet of claim 18, wherein the expanded thermoplastic sheet has a shear strength of about 0.2 MPa to about 40 MPa according to the ASTM C78 test.

24. The expanded thermoplastic sheet of claim 18, wherein the cells of the first outer region and second outer region have an aspect ratio of about 1:1.

25. The expanded thermoplastic sheet of claim 18, wherein the cells of the first outer region and second outer region have a dimension of from about 25 µm to about 75 µm.

26. The expanded thermoplastic sheet of claim 18, wherein the cells of the inner region have a length to width aspect ratio of greater than about 1:1.

27. An article, comprising:
    a first outer region having a first thickness and including a first plurality of cells;
    a second outer region having a second thickness and including cells having a second plurality of cells, the first plurality of cells and the second plurality of cells having a first average dimension; and an inner region disposed between the first outer region and the second outer region, the inner region having a third thickness between about 1 mm and about 2 mm, the inner region including a third plurality of cells having a second average dimension greater than the first average dimension, wherein the article has a tensile strength of about 0.2 MPa to about 50 MPa according to the ASTM C78 test.

28. The article of claim 27, wherein the article has a crystallinity between about 25% and about 75%.

29. The article of claim 27, wherein the article has a specific weight of less than about 0.5 g/in$^3$.

30. The article of claim 27, wherein the article has a density of about 0.05 g/cc to about 0.25 g/cc.

31. The article of claim 27, wherein the article has a flexural strength of about 0.2 MPa to about 80 MPa according to the ASTM C78 test.

32. The article of claim 27, wherein the article has a shear strength of about 0.2 MPa to about 40 MPa according to the ASTM C78 test.

33. The article of claim 27, wherein the cells of the first outer region and second outer region have an aspect ratio of about 1:1.

34. The article of claim 27, wherein the cells of the first outer region and second outer region have a dimension of from about 25 μm to about 75 μm.

35. The article of claim 27, wherein the cells of the inner region have a length to width aspect ratio of greater than about 1:1.

36. An article, comprising:
a first outer region having a first thickness and including a first plurality of cells;

a second outer region having a second thickness and including cells having a second plurality of cells, the first plurality of cells and the second plurality of cells having a first average dimension; and an inner region disposed between the first outer region and the second outer region, the inner region having a third thickness between about 1 mm and about 2 mm, the third thickness less than the first thickness and the second thickness, the inner region including a third plurality of cells having a second average dimension greater than the first average dimension, wherein the article has a shear strength of about 0.2 MPa to about 40 MPa according to the ASTM C78 test.

37. The expanded article of claim 36, wherein the article has a crystallinity between about 25% and about 75%.

38. The article of claim 36, wherein the article has a specific weight of less than about 0.5 g/in$^3$.

39. The article of claim 36, wherein the article has a density of about 0.05 g/cc to about 0.25 g/cc.

40. The article of claim 36, wherein the article has a flexural strength of about 0.2 MPa to about 80 MPa according to the ASTM C78 test.

41. The article of claim 36, wherein the article has a tensile strength between about 0.2 MPa and about 50 MPa.

42. The article of claim 36, wherein the cells of the first outer region and second outer region have an aspect ratio of about 1:1.

43. The article of claim 36, wherein the cells of the first outer region and second outer region have a dimension of from about 25 μm to about 75 μm.

44. The article of claim 36, wherein the cells of the inner region have a length to width aspect ratio of greater than about 1:1.

* * * * *